(12) United States Patent
De Haan

(10) Patent No.: US 8,548,305 B2
(45) Date of Patent: Oct. 1, 2013

(54) METHOD AND APPARATUS FOR RECORDING A DIGITAL INFORMATION SIGNAL

(75) Inventor: Wiebe De Haan, Eindhoven (NL)

(73) Assignee: Koninklijke Philips N.V., Eindhoven (NL)

(*) Notice: Subject to any disclaimer, the term of this patent is extended or adjusted under 35 U.S.C. 154(b) by 1736 days.

(21) Appl. No.: 11/912,322

(22) PCT Filed: Apr. 20, 2006

(86) PCT No.: PCT/IB2006/051216
§ 371 (c)(1),
(2), (4) Date: Oct. 23, 2007

(87) PCT Pub. No.: WO2006/114729
PCT Pub. Date: Nov. 2, 2006

(65) Prior Publication Data
US 2009/0269041 A1    Oct. 29, 2009

(30) Foreign Application Priority Data

Apr. 26, 2005  (EP) .................................... 05103368
Aug. 9, 2005  (EP) .................................... 05107314

(51) Int. Cl.
*H04N 5/94* (2006.01)
(52) U.S. Cl.
USPC ........................................................ 386/335
(58) Field of Classification Search
None
See application file for complete search history.

(56) References Cited

U.S. PATENT DOCUMENTS 7,167,635 B1 * 1/2007 Ando et al. ................... 386/248
2003/0068159 A1   4/2003 De Haan

FOREIGN PATENT DOCUMENTS

| EP | 0390268 | A2 | 10/1990 |
| EP | 0942426 | A2 | 9/1999 |
| EP | 0942426 | * | 12/1999 |
| WO | 0101416 | A1 | 1/2001 |
| WO | 03030173 | A2 | 4/2003 |

* cited by examiner

*Primary Examiner* — William C Vaughn, Jr.
*Assistant Examiner* — Daniel Tekle

(57) ABSTRACT

Method and apparatus of contiguously recording a sequence of ordered A/V information signals, and corresponding management information signals, on a disc-like recording medium of the write-once type. The method comprises allocating a reserved area within a linear addressing space of the disc, contiguously recording the A/V information signals in a video recording area located succeeding the reserved area, recording corresponding management data in a temporary overview space succeeding the video recording area, generating a mapping table (39) for mapping the recorded management data to address locations in the reserved area and recording the mapping table (39) in the temporary overview space. The mapping table (39) used when recording information according to VCPS comprises a structure (39a), preventing the overwriting of the management data by recorders not familiar with VCPS. The structure is preferably formed by a mapping-table header field (39a) containing dummy data.

32 Claims, 12 Drawing Sheets

| RBP | | Contents | Number of bytes |
|---|---|---|---|
| 0 | RSAT_ID | RSAT Identifier | 4 bytes |
| 4 | reserved | reserved | 2 bytes |
| 6 | RSAT_COUNT | RSAT update counter | 2 bytes |
| 8 | RSAT_FMT_ID | RSAT Format Identifier | 1 byte |
| 9 | PREV_RSAT | Previous location of RSAT | 3 bytes |
| 12 | reserved | reserved | 1 byte |
| 13 | END_DATA | End of active part of Data Zone | 3 bytes |
| 16 | RSAT_MAPT_SA | Offset to start of RSAT_MAPT | 2 bytes |
| 18 | RSAT_MAPT_SZ | Size of RSAT_MAPT | 2 bytes |
| 20 | reserved | reserved | 1004 bytes |
| 1024 | RSAT_UD | RSAT user data | 1024 bytes |
| 2048 | RSAT_MAPT | RSAT Mapping Table containing 992 RSAT_ITEMs of 4 bytes | 4096 bytes |
| | | Total | 6144 bytes |

FIG. 12

METHOD AND APPARATUS FOR RECORDING A DIGITAL INFORMATION SIGNAL

FIELD OF THE INVENTION

The invention relates to a method of contiguously recording a sequence of ordered A/V information signals, such as video/audio information, and corresponding management information signals, such as video management, menu information or file information, on a disc-like recording medium of the write-once type, such as an optically recordable and readable disc, the recorded information complying to the requirements of ordering of such information as defined by a disc of the read-only type or of the rewritable type.

The invention also relates to a recording device for contiguously recording a sequence of ordered A/V information signals, such as video/audio information, and corresponding management information signals, such as video management, menu information or file information, the recorded information complying to the requirements of ordering of such information as defined by a disc of the read-only type or of the rewritable type, the recording device comprising means for carrying and rotating a disc-like recording medium of the write-once type, such as an optically recordable and readable disc, means for scanning a focused laser beams across a track of the disc-like recording medium, means for modulating the laser beam in accordance with digital information signals to be recorded on the disc-like recording medium, means for detecting reflections of the laser beam scanning the disc-like recording medium and converting the reflection in digital information signals to be read, means for modulating received digital A/V information signals to information signals to be recorded and control means for controlling the recording and reading of the digital information signal.

The invention further relates to a data medium comprising an executable computer program code for controlling the operation of a recording device in contiguously recording a sequence of ordered A/V information signals, such as video/audio information, and corresponding management information signals, such as video management, menu information or file information, on a disc-like recording medium of the write-once type, such as an optically recordable and readable disc, the recorded information complying to the requirements of ordering of such information as defined by a disc of the read-only type or of the rewritable type.

The invention finally relates to a disc-like recording medium such as an optically recordable and readable disc, carrying recorded information complying with the requirements of ordering of such information as defined by a disc of the read-only type or of the rewritable type, the recorded information comprising encrypted information content.

BACKGROUND OF THE INVENTION

A method and device of the aforementioned type are known from International Patent Application WO2003030173 (PHNL010708), which is hereby enclosed by reference.

WO 2003/030173 discloses that in an open DVD+R Video Session, a Reserved Fragment of the open session is treated as a virtual rewritable area of 31 Megabyte (MB) size. As is known in the art, the layout of an open DVD Video Session has a data zone with two fragments, which are a Reserved Fragment followed by an Incomplete Fragment. The Reserved Fragment is kept completely unwritten until the Video Session is closed. Data intended for this area of 31 MB is temporarily written into the Incomplete Fragment. The Incomplete Fragment contains all files and file system data that is required to be present in the data zone of a closed DVD Video Session.

The mentioned method and apparatus provide a virtual management area, which is mapped to a real physical location in the Reserved Area by a mapping table. Only when finalizing a disc, that is, when providing the disc with a Lead-In and a Lead-Out area to make the disc playback-compatible, the management data structures are copied to the correct location in the reserved area.

For writing the Reserved Fragment during finalization, the recording device refers to a table stored at the very end of the recorded area in the Incomplete Fragment, the Reserved Space Allocation Table (RSAT). The RSAT provides exact information on the location of temporarily stored data that needs to be copied to the Reserved Fragment. DVD+RW video recording devices write the RSAT in the last written ECC blocks on a DVD+R disc after one or more recordings have been made, or after a playlist or menu editing has been done. This video format is defined in the DVD+R/RW Video format Specifications, which are already introduced in the market.

In the United States, as of 1 Jul. 2005, digital video recorders have to encrypted recorded television (TV) broadcasts that carry a Broadcast Flag. The Broadcast Flag is a digital code that can be embedded into a digital broadcasting stream according to the regulations of the U.S. Advanced Television Systems Committee (ATSC). A similar regulation in Japan already requires the encrypted recording of digital TV broadcast signals.

The aim of introducing this method of information content encryption is to prevent unlicensed mass distribution over the Internet. An example of a content protection system, which is in accordance with the Broadcast Flag rules is the known Video Content Protection System (VCPS) for disc-like recording media such as recordable Digital Versatile Discs (DVD+R) and rewritable Digital Versatile Discs (DVD+RW). VCPS also enables direct digital recording of "copy-once" content from satellite and cable sources.

According to the VCPS system, a disc containing encrypted content is provided with a unique identification code, hereinafter Unique ID, which is a 40-bit random number that is deposited on the disc by a recording device recording encrypted content according to the VCPS. An example of a recording device is an optical drive of a personal computer, which is adapted to record DVDs or a consumer electronics DVD recorder.

A disc containing content encrypted according to the VCPS also stores a Disc Key Block (DKB), which is a list of encrypted keys. VCPS-compliant devices for reproducing the encrypted content, such as a DVD video player, are provided with an individual Hardware Device Key (HDK). Software players and recorders are provided with a Software Device Key (SDK). Encrypting and decrypting information content involves calculating a special key, which is a function of the HDK/SDK, the Unique ID of the individual disc and the Disc Key Block stored on the disc. More information on VCPS can be found on the Internet at the URL http://www.licensing.philips.com/vcps.

When finalizing the disc, a DVD+RW video recorder fills the Reserved Fragment with file system data and DVD menu files. Examples of such menu files are IFO files including information on, for instance, chapters, subtitle tracks and audio tracks, or VOB files containing actual video objects such as movie files with video/audio data.

In finalizing a disc also a Lead-in-Zone located at the inner side of the disc is recorded. The structure of the Lead-In-Zone as a part of the video format is well known in the art, and is for instance found in the standard ECMA-349, second edition, June 2004, pages 55 to 58. The Lead-In-Zone contains a so-called Buffer Zone 2.

However, in DVD+R and DVD+RW discs containing a session recorded according to the VCPS, the Unique ID and the Disc Key Block are stored in Buffer Zone 2. According to VCPS, as soon as a first encrypted A/V recording is added to the disc, Buffer Zone 2 is written to contain the Unique ID and the Disc Key Block. This use of Buffer Zone 2 is not reserved for the purposes of VCPS by other disc standards. Thus, if such a disc is finalized by a recording device not familiar with VCPS, that device will be unaware of the fact that Buffer Zone 2 contains essential VCPS data, namely, the Unique ID and the Disc Key Block necessary to decrypt encrypted content on the disc. In writing the Lead-In-Zone according to a standard recording method not compliant with VCPS, Buffer Zone 2 will therefore be overwritten. The Unique ID and the Disc Key Block will be destroyed. As a result, the encrypted video content can not be decrypted anymore.

In other words, legacy (non-VCPS) video recorders are not aware of any content protection that may have been applied. They might finalize the disc, which includes writing the complete Lead-In area, thereby destroying the Unique ID and the Disc Key Block, rendering the encrypted content non-decryptable for legacy devices as well as VCPS-compliant devices.

OBJECT AND SUMMARY OF THE INVENTION

It is therefore an object of the present invention to improve a recording method of the aforementioned type so as to protect key information related to encrypted content on a disc.

It is another object of the present invention to improve a recording device of the aforementioned type so as to protect key information related to encrypted content on a disc.

It is another object of the present information to improve a disc-like recording medium of the aforementioned type so as to protect key information related to encrypted content on a disc.

According to a first aspect of the invention, a method is provided for contiguously recording a sequence of ordered A/V information signals, such as video/audio information, and corresponding management information signals, such as video management, menu information or file information, on a disc-like recording medium of the write-once type, such as an optically recordable and readable disc, the recorded information complying to the requirements of ordering of such information as defined by a disc of the read-only type or of the rewritable type. The method comprises the following steps:
a) allocating a reserved area within a linear addressing space
b) contiguously recording the A/V information signals in a video recording area located succeeding the reserved area;
c) recording corresponding first management data in a temporary overview space succeeding the video recording area;
d) generating a mapping table for mapping the recorded first management data to address locations in the reserved area;
e) recording the mapping table in the temporary overview space.

In the method of the invention, the step of generating the mapping table comprises selecting and performing one of the following alternative steps, if a respective one of the following conditions applies:

f) generating the mapping table in the form of a first mapping-table structure, if A/V information signals representing an encrypted information content are recorded or if the recording medium already contains encrypted information content due to prior encrypted recording; and
g) generating the mapping table in the form of a second mapping-table structure differing from the first mapping-table structure, if A/V information signals representing a non-encrypted information content are recorded and if the recording medium does not contain any prior encrypted information content.

According to the method of the invention, a selection is made between two alternative ways of generating the mapping table.

A first alternative comprises generating the mapping table in the form of a first mapping-table structure. This alternative is selected, if A/V information signals representing an encrypted information content are recorded. It is also selected if the recording medium already contains encrypted information content due to a prior encrypted recording of information content. It is understood that the first alternative is also selected if both conditions just mentioned apply.

The second alternative comprises generating the mapping table in the form of a second mapping-table structure differing from the first mapping-table structure. This second alternative is selected if A/V information signals representing a non-encrypted information content are recorded, and if the recording medium does not contain any prior encrypted information content. Thus, there are two conditions, which must both apply in a cumulative way in order to trigger the selection of the second alternative of generating the mapping-table.

The mentioned two alternatives of generating the mapping table differ in the resulting mapping-table structure. The term mapping-table structure refers to the organization of the mapping table, which for instance means the size of the mapping table, the number, respective size or order of data fields contained in the mapping table or similar structural features.

The method of the invention provides an effective way of indicating that a disc contains encrypted information content. It allows, in a preferred embodiment, to use as a second mapping-table structure the structure given by known video format standards. This way, legacy recording devices as well as those compliant with an information encryption system such as VCPS will generate and read identical mapping-table structures. This provides backward compatibility of VCPS-compliant devices for the case that recorded information signals represent a non-encrypted information content and that the recording medium does not contain any other prior encrypted information content.

On the other hand, the invention provides an effective protection against the overwriting of sensitive keys by a legacy device after an earlier encrypted recording session involving the storage of keys in the Lead-In-Area. Due to the structural difference between the first and second mapping-table structures, a legacy device will not be able to correctly interpret the data contained in the mapping-table. For a legacy device is not aware of the first mapping-table structure and therefore is not able to correctly interpret the data contained therein. As a consequence, a legacy device will stop reading the mapping-table, typically resulting in the cancellation of the recording process. This way, the Lead-In-Area is protected from being written, and the key data stored therein as well.

In the following, preferred embodiments of the method of the invention will be summarized. The embodiments can be combined with each other, unless otherwise stated.

According to one embodiment, the step of generating the mapping table comprises generating a sequence of mapping-data fields. In generating this sequence for the first mapping-table structure, a sequence of mapping-data fields forming the complete second mapping-table structure is generated, and, in addition, a dummy-data field. Thus, the first mapping-table data structure of this embodiment differs from the second mapping-table data structure only in the fact that it contains an additional dummy-data field. This results in an increase of the overall size of the first mapping-table structure as compared with the second mapping-table structure. This structural change between a second mapping-table and a first mapping table is easy to implement and an effective means to prevent overwriting. In particular, if the second mapping-table structure is that known from earlier standards, which are used by legacy devices, this embodiment ensures backward compatibility with those standards.

Preferably, the dummy-data field is recorded beginning at a first position reserved for the beginning of the mapping table. For this reason, the dummy-data field of the present embodiment is also referred to as a mapping-table header field herein. This implies that the method of the present embodiment allocates identical beginning positions to a mapping table, irrespective of whether it has the first or the second mapping-table structure. Both a legacy device and a device compliant with content encryption will look for the mapping table at an identical position. However, only a device compliant with content encryption knows that the first data field of the mapping table is a dummy-data field and need not read. A legacy device will expect mapping data according to the second mapping-table structure, which, however, are not present in dummy-data field. Thus, the legacy device will stop reading the mapping table at the very beginning.

In a further preferred embodiment the steps of generating the mapping table in the form of the first and of the second mapping-table structure comprise generating the mapping table as an integral part of a Reserved Space Allocation Table, and in that the beginning of the mapping table is defined relative to a position of a mapping-table-pointer data field contained in the Reserved Space Allocation Table. In this embodiment, the known structure of the Reserved Space Allocation Table (RSAT) is used. A legacy device will look for the beginning of the mapping table at a position defined in the mapping-table-pointer data field of the RSAT. However, if encrypted content is present, the dummy data field at the beginning of the mapping table will not provide the data expected by a legacy device.

In this embodiment, in the second mapping-table structure, the beginning of the mapping table is preferably formed by a first mapping-data field for mapping at least one area in the temporary overview space containing recorded first management data to an address location in the reserved area. The dummy-data field of the first mapping-table structure is contains only dummy data unsuitable for mapping areas in the temporary overview space to address locations in the reserved area. As explained before, a legacy device will stop reading the mapping table and, thus, the recording of the disc, thus avoiding a situation, in which the key information on the disc is overwritten.

Preferably, the step of generating the dummy data field comprises generating 128 consecutive bytes of dummy data. In one embodiment, identical bit values are recorded at all bit positions of the dummy-data field. Preferably, the bit value recorded to all bit positions of the dummy-data field is "0". In this embodiment, a prior-art device making use of the RSAT mapping-table pointer data will look for the actual mapping data 128 bytes too early. These 128 bytes of dummy data result in 32 ECC blocks, which are not used (corresponding to 1 Megabyte of data), and this is where the file system should be. Thus, legacy recorders cannot recognize the disc as a valid DVD+R video recording format disc. Reading is stopped and the key data stored in buffer zone 2 is not destroyed. Thus, the behavior of a recorder that is unfamiliar with the encryption, in particular with the VCPS encryption system, is predictable.

A further preferred embodiment comprises, before the step of generating the mapping table, a step of ascertaining whether information content to be recorded is encrypted. A further embodiment comprises an additional step of ascertaining whether the disc already contains encrypted information content. Clearly, the steps of these embodiments should be performed before the selecting step of the method of the invention. However, it is understood that it can be evident to a recording process that encrypted information content is to be recorded or already present on the disc.

A further embodiment of the method of the invention comprises a step of encrypting information content to be recorded, so as to impede unlicensed access to the information content. Other embodiments do not include this encryption step. For instance the information used by the method of the invention may already be encrypted according to a content encryption method. It is noted, however, that such an embodiment would not be in compliance with the VCPS.

According to a further embodiment, the step of encrypting the information comprises encrypting the information content according to the Video Content Protection System, VCPS.

A further embodiment comprises contiguously recording a next sequence of A/V information signals on a next video recording area succeeding the previously recorded areas; The present embodiment extends the method of the invention to the case of a second video session, which may or may not comprise recorded encrypted information and is added to a prior recording of information content on the same disc, which prior information content may or may not be encrypted.

According to the present embodiment, the recorded next mapping table serves for mapping both the earlier recorded management data of the prior mapping table and the management data generated in the current session.

This embodiment preferably further comprises generating updated management information signals related to the mapping table recorded earlier, recording at least the updated management information signals in the next temporary overview space succeeding the previous temporary overview space, and recording the next mapping table in the next temporary overview space.

A further embodiment comprises the steps of copying the recorded management information signals to the reserved area in correspondence to the latest mapping table, recording the remaining unrecorded sections of the reserved area with arbitrary data signals, and recording a lead-in area preceding the reserved area with data according to the definitions of a disc of the read-only type or of the rewritable type.

If the latest mapping table takes the form of the first mapping-table structure, a buffer zone 2 that is contained in the lead-in area according to the definitions of a disc of the read-only type or of the rewritable type is not recorded in this step. Further, a step of recording a lead-out area succeeding the recorded area with data according to the definitions of a disc of the read-only type or of the rewritable type or with closure data for closing an actual video recording session is performed.

According to a second aspect of the invention, a recording device is provided for contiguously recording a sequence of ordered A/V information signals, such as video/audio information, and corresponding management information signals, such as video management, menu information or file information, the recorded information complying to the requirements of ordering of such information as defined by a disc of the read-only type or of the rewritable type, the recording device comprising:

means for carrying and rotating a disc-like recording medium of the write-once type, such as an optically recordable and readable disc, means for scanning a focused laser beams across a track of the disc-like recording medium;

means for modulating the laser beam in accordance with digital information signals to be recorded on the disc-like recording medium;

means for detecting reflections of the laser beam scanning the disc-like recording medium and converting the reflection in digital information signals to be read; and means for modulating received digital A/V information signals to information signals to be recorded; control means for controlling the recording and reading of the digital information signals.

The control means is further adapted to allocate a reserved area within a linear addressing space on the disc-like recording medium; to contiguously record the A/V information signals in a video recording area located succeeding the reserved area;

record corresponding first management data in a temporary overview space succeeding the video recording area;

generate a mapping table for mapping the recorded first management data to address locations in the reserved area; record the mapping table in the temporary overview space.

In the recording device of the second aspect of the invention, the control means is further adapted to select and perform one of the following two alternative steps, if a respective one of the following conditions applies:

generate the mapping table in the form of a first mapping-table structure if A/V information signals representing an encrypted information content are to be recorded or if the recording medium already contains encrypted information content due to prior encrypted recording, and generate the mapping table in the form of a second mapping-table structure differing from the first mapping-table structure, if A/V information signals representing a non-encrypted information content are recorded and if the recording medium does not contain any prior encrypted information content.

The advantages of the recording device of the second aspect of the invention correspond to those of the method of the first aspect of the invention. Preferred embodiments of the recording device of the invention are adapted to implement embodiments of the method of the first aspect of the invention.

According to a third aspect of the invention, a data medium is provided comprising an executable computer program code for controlling the operation of a recording device in contiguously recording a sequence of ordered A/V information signals, such as video/audio information, and corresponding management information signals, such as video management, menu information or file information, on a disc-like recording medium of the write-once type, such as an optically recordable and readable disc, the recorded information complying to the requirements of ordering of such information as defined by a disc of the read-only type or of the rewritable type.

The computer program code implements a method comprising the following steps:

allocating a reserved area within a linear addressing space; contiguously recording the A/V information signals in a video recording area located succeeding the reserved area;

recording corresponding management data in a temporary overview space succeeding the video recording area;

generating a mapping table for mapping the recorded management data to address locations in the reserved area;

recording the mapping table in the temporary overview space.

The step of generating the mapping table comprises selecting and performing one of the following alternative steps, if a respective one of the following conditions applies:

generating the mapping table in the form of a first mapping-table structure, if A/V information signals representing an encrypted information content are recorded or if the recording medium already contains encrypted information content due to prior encrypted recording, and generating the mapping table in the form of a second mapping-table structure differing from the first mapping-table structure, if A/V information signals representing a non-encrypted information content are recorded and if the recording medium does not contain any prior encrypted information content.

The data medium of the invention may be used for controlling the operation of recording devices. It may also be used to update legacy devices such as software applications or devices comprising programmable memory for executable software controlling the operation of the device. Preferred embodiments of the data medium of the invention comprise an executable computer program for implementing an embodiment of the method of the first aspect of the invention.

Another aspect of the invention is a disc-like recording medium of the write-once type, such as an optically recordable and readable disc, carrying recorded information complying to the requirements of ordering of such information as defined by a disc of the read-only type or of the rewritable type, the recorded information comprising encrypted information content, and including a reserved area within a linear addressing space encrypted A/V information in a video recording area located succeeding the reserved area;

management data in a temporary overview space succeeding the video recording area;

a mapping table in the temporary overview space for mapping the management data to address locations in the reserved area.

In the recording medium of the present aspect the mapping table takes the form of a first mapping-table structure containing a sequence of mapping-data fields for mapping areas in the temporary overview space to address locations in the reserved area, and, beginning at a first position reserved for the beginning of the mapping table, a dummy-data field that is completely formed by dummy data unsuitable for mapping areas in the temporary overview space to address locations in the reserved area.

The recording medium of the present aspect of the invention reflects the advantage that it comprises a mapping-table structure that protects recorded key information on the disc. Preferred embodiments of the recording medium of the present aspect of the invention result from the performance of the method of the invention. For instance, a preferred embodiment of the recording medium of the invention comprises a Lead-In-Area, in which key data is stored. The key data comprises a unique identifier of the recording medium and a disc key block, preferably according to VCPS specifications. The key data is stored in Buffer Zone 2 of the Lead-In-Area of the recording medium. In a further embodiment the mapping table forms an integral part of a Reserved Space Allocation Table. The beginning of the mapping table is defined relative to a position of a mapping-table-pointer data field contained in the Reserved Space Allocation Table.

BRIEF DESCRIPTION OF THE DRAWINGS

These and other aspects and advantages of the present invention will be clarified in more detail with reference to the disclosure of preferred embodiments, and in particular with reference to the appended Figures that show:

FIG. 12 an embodiment of a Reserved Allocation Table for a disc with VCPS structures.

DESCRIPTION OF THE EMBODIMENTS

Figure 1:
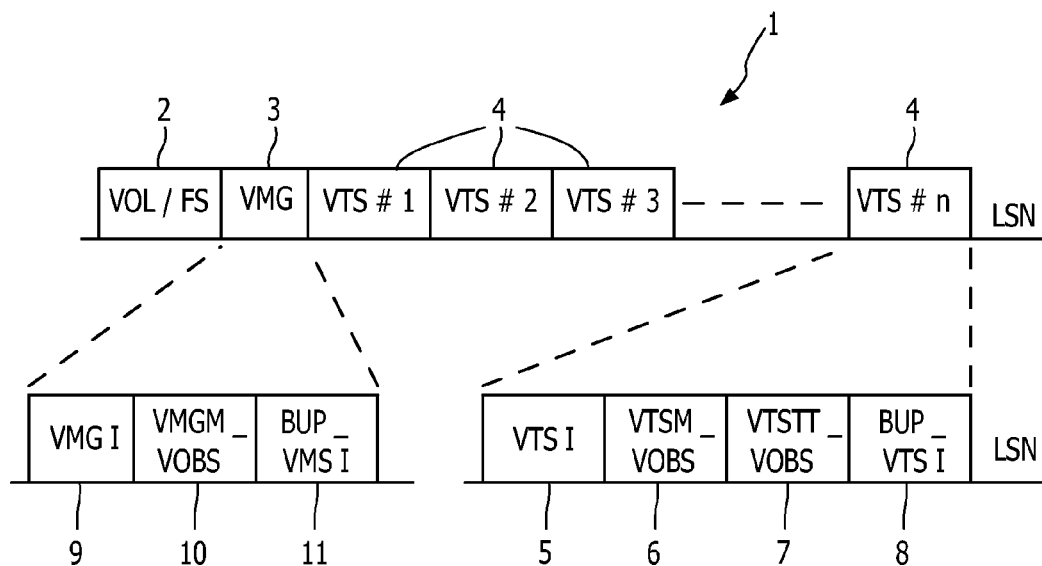
FIG. 1 the DVD-Video data structure on a DVD disc of the Read-Only type.

FIG. 1 shows the video data structure 1 on an optically readable disc of the DVD-Read Only type. The sequence of data is arranged from left to right in order of increasing logical sector numbers (LSN), a sector being the smallest unit of addressing data stored on a DVD disc. Typically one sector corresponds to 2048 user data bytes. For clarity reasons additional disc zones such as a Lead-in zone and a Lead-out zone are not shown.

The video data structure 1 comprises a Volume and File System (VOL/FS) data t 2, Video Manager (VMG) data 3, and several Video Title Sets (VTS#1, VTS#2, VTS#3, VTS#n) 4-7.

Volume and File System 2 data defines the DVD Video Volume space according to the Universal Disc Format UDF known in the art. The video data in one Volume is composed of one Video Manager (VMG) 3 and one or more Video Title Sets (VTS) 4. The file system data enables addressing data objects in the so-called DVD Video zone comprising the Video Manager (VMG) data 3 and the Video Title Sets 4 (VTS). Adapting the data object in this DVD Video Zone may require adapting of the file system data also.

A Video Title Set (VTS#n) 4 is a unit describing a complete video content or Title. It is composed of VTS Information (VTSI#n) to control the Title and the Menu in the Video Title Set (VTS#n) 4, the Video Object Set for the Menu (VTSM_VOBS) 6, the Video Object Set for the Title (VTSTT_VOBS) 7 and a backup of the VTSI (BUP_VTSI) 8. A Video Object Set (VOBS) is a collection of Video Objects (VOB). A VOB is an MPEG Program stream made up of a group of Elementary streams, such a Video, Audio, Sub-picture, Program Control Information (PCI) and Data Search Information (DSI).

The VTSI 5, VTSM_VOBS 6, VTSTT_VOBS 7 and VTSI_BUP 8 shall be allocated in this order. Files comprising VTSTT_VOBS 6 shall be allocated contiguously.

The Video Manager 3 comprises the Video Manager Information (VMGI) 9, the Video Object Set for the VMG Menu (VMGM_VOBS) 10 and the backup of the VMGI (VMGI_BUP) 11.

Figure 2:
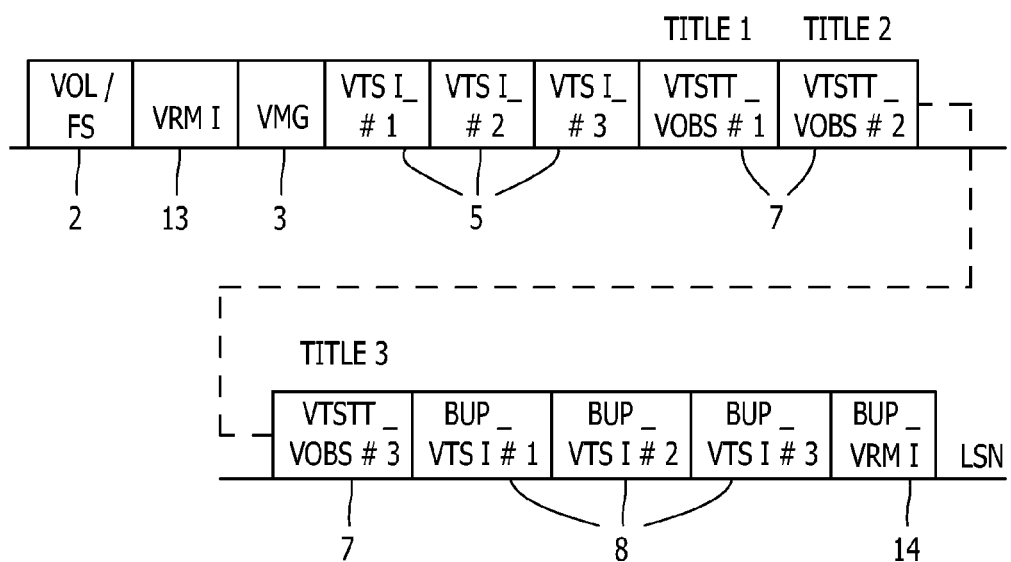
FIG. 2 a DVD-Video data structure on a DVD disc of the rewritable type.

FIG. 2 shows a DVD-Video data structure 12 on a DVD disc of the Rewritable type, specifically according to the DVD+RW type, using same reference numbers as in FIG. 1 to indicate equivalent parts. The shown DVD-Video data structure 12 is according to a method and recording device as disclosed in the International Patent Application WO 01/01416-A1 (PHN 17522), which is incorporated by reference herewith. In order to maintain playback compatibility with existing DVD-players intended for DVD discs of the Read-only type, the restrictions of the corresponding Video data structures 1 on these discs should be taken into account, especially when several recordings are made.

In FIG. 2 an example is given showing three recordings (TITLES) represented by the Video Object Set for the Title (VTSTT_VOBS#1, VTSTT_VOBS#2, VTSTT_VOBS#3) 7 and the corresponding Video Title Set Information (VTSI#1, VTSI#2, VTSI#3) 5. Typically of the referred method is the order of these data, the VTS management information VTSI 5 always preceding the Video Object Sets VTSTT_VOBS 7 and the backup data VTSI_BUP 8 always succeeding. This sequence of data can be viewed as one Video Object Title Set (VTSTT_VOBS), meeting the restrictions of the DVD-Video data structure 1 of the DVD-Video disc of the Read Only type.

Additional to these data, Video Recording Management Information data (VRMI) 13 and a corresponding backup VRMI_BUP 14 are present. It includes the information to identify which type of recorder has generated the DVD/Video menus on the disc. Not shown is other typical recorder information data such as Video Recording Management Scratch Area (VRM Scratch), which in turn may be used by recorders to temporally store data and a VRM User Data area, which may be used to add additional performance on some recorders. This data will be neighboring the VRMI data 13.

Figure 3A:
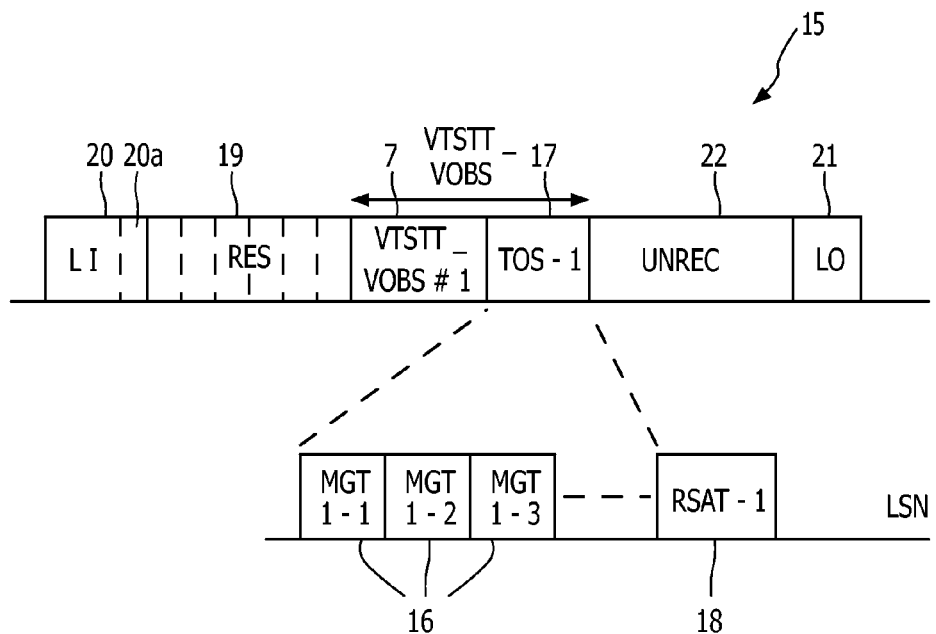
FIGS. 3A-3D DVD-Video data structures on a DVD disc of the recordable type.

FIG. 3A illustrates a first example of a DVD Video data structure 15 for a DVD disc of the Recordable Type (record once) after a first recording. This first recording is represented by the VTSTT_VOBS#1 and the corresponding file and management information, which is stored in Management Data Areas (MGT1-1, MGT1-2, MGT1-3) 16. These areas comprise the VTSI#1, VMG, VRMI, and File System Information such as UDF. In addition the back-up file of the VTSI, the VRMI and a second AVDP are recorded contiguously in this order.

The AVDP represents the Anchor Volume Descriptor Pointer that is required by the UDF file system. The AVDP is always stored on a fixed location to enable a computer system to recognize that the data is stored in the UDF format. The AVDP gives the location of a logical volume descriptor sequence (LVDS), which contains a series of data structures regarding the structure and location of data stored on the disc. This includes references to one or more file set descriptors FSD. The AVDP can thus be regarded as the start of the (UDF) file system. A second AVDP is a backup of a this (first) AVDP.

The Temporary Overview Space 17 contains all management information and file information required by the DVD/Video data structure for the DVD disc of the rewritable type as disclosed in the above-mentioned patent application.

The Management Data Areas (MGT) 16 is however not recorded in front of the VTSTT_VOBS 7, as normally required by the DVD Video Data structures for the DVD disc of the Read-Only or the Rewritable Type, but is recorded after the VTSTT_VOBS 7 of the first recording in a Temporary Overview Space (TOS) 17. This Temporary Overview Space (TOS) 17 includes a Reserved Space Allocation Table (RSAT) 18 containing a mapping of the Management Data Areas (MGT) to locations in the Reserved Space (RES) 19 in front of the VTTT_VOBS. The Reserved Space 19 is not used for recording until the last recording has been made and a disc finalization step is being performed. The finalization step includes copying all Management Data Areas 16 to this Reserved Space 19 using the mapping in the Reserved Space Allocation Table 18. For this, the Reserved Space Allocation table contains a mapping table. Only after such a finalization step, playback compatibility with DVD Players intended for DVD Video discs of the Read-Only type or the Rewritable Type is being obtained. This will be explained in more detail hereafter.

Since the present Video Data structure reflects the state after a first recording, there is no prior VCPS-encrypted content on the disc. Therefore, recording the disc involves writing a Unique ID of 40 bits to the "Buffer Zone 2" 20*a* of the Lead-In zone 20 of the disc. Therefore, only in case the recorded video objects of the present recording are encrypted according to a content encryption method like, preferably, VCPS, the mapping table is extended in comparison to known legacy mapping table structures contained in the Reserved Space Allocation Table (RSAT) by a header field of 128 byte of "0" bits, as will be explained in further detail further below.

The Reserved Space 19 starts after the Lead-In Area (LI) 20 and ends at Logical Sector Number R. At a typical DVD disc the first Physical Sector after the Lead-In-Area 20 is assigned 0003 0000h (h: hexa-decimal) and increases to the start of the Lead-Out Area (LO) 21 to a value of for instance 00026 0540h. This corresponds to a total of 2 295 104 (d: decimal) Physical Sectors where a Physical Sector contains 2048 user data bytes.

However, all Physical Sectors are mapped for addressing purposes to Logical Sectors with a Logical Sector Numbering (LSN). The start of the recording space after the end of the Lead-In Area 20 is indicated by Logical Sector Number 0000 0000h and increases to the start of the Lead-Out area 21 until Logical Sector Number 0022 FF40h.

The Reserved Space 19 is arranged form Logical Sector Number 0000 0000h (or Physical Sector Number 0003 0000h) to Logical Sector Number 0000 3FFF h (or Physical Sector Number 0003 3FFFh), corresponding to approximately 32 Mbytes. This value is chosen in view of the DVD Video Data structure for the a DVD disc of a rewritable type. However, the Reserved Space 19 may be chosen any size. Further, multiple reserved areas are also possible.

Mapping may be applied on the basis of Error Correction Blocks (ECC-Blocks). A typical DVD ECC block may comprise 16 Physical Sectors in addition to error correction data. Within an ECC block, data is recorded at the actual location in the same order as it would haven been without at the intended location.

Additional recordings should be made in the Unrecorded Area (UNREC) after the Temporary Overview Space 17. As long as the recordable DVD disc has not been finalized, also being indicated by the presence of an open session, the Reserved Space 19 shall not be recorded.

Figure 3B:
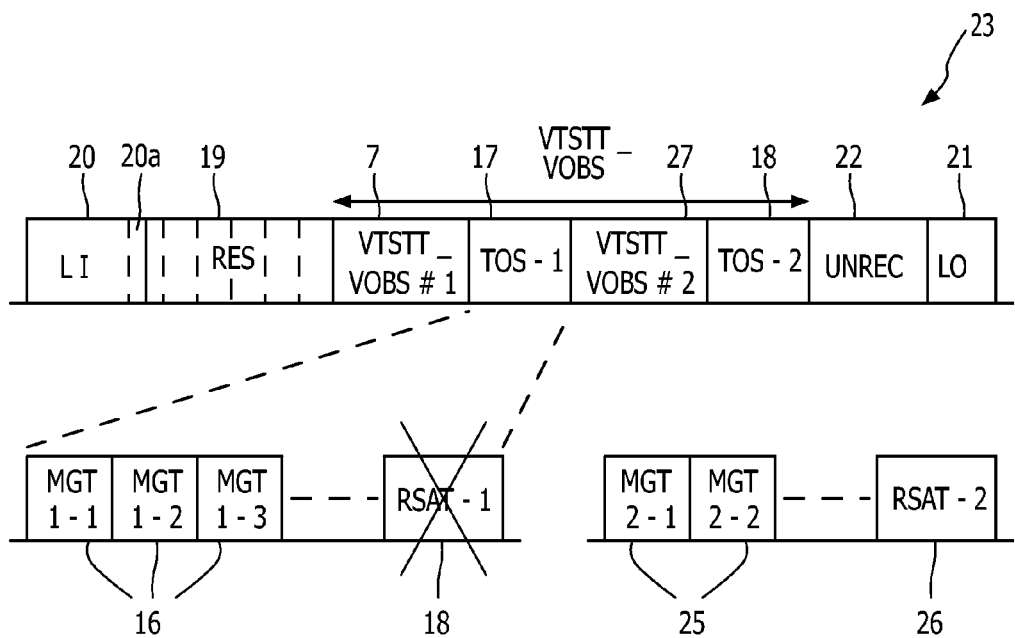

Next, FIG. 3B shows a Video Data structure 23 after a second recording has been made. Same reference numbers indicate corresponding structures in FIG. 3A. The second recording, represented by VTSTT_VOBS#2 27, is appended to the first Temporary Overview Space 17. The corresponding Management Data (MGT2-1, MGT2-2) 25 and a second Reserved Space Allocation Table (RSAT-2) 26 is appended to the second recording. This RSAT-2 contains not only the mapping of the Management Data 25 of the second recording, but also the mapping of the Management Data 16 of the first recording. The Reserved Space Allocation Table RSAT-1 will therefore not be used anymore. As will be explained hereafter, a Reserved Space Allocation Table comprises a version number, to indicate which version is obsolete.

As a result, the VTSTT-VOBS#1 7, the TOS-1 17, the VTSTT_VOBS#2 and the TOS_2 can be regarded as continuous VTSTT_VOBS. The sequence may contain sectors in a format not known to DVD Video Players, but as long they are not referenced by any Program Chain, they do not disturb the correct operation of the players.

A Program Chain is used in the DVD Video data structures for a DVD disc of the Read-Only type, to indicate part of or the entire Title or Menu. It defines the Cells to be presented, a Cell being the basic unit to be presented. A Cell consists of a number of Video Object Units (VOBU) and forms part of a VOB.

According to the present embodiment of the invention, the Video Data structure 28 contains a RSAT-2 with a mapping table having a mapping-table header of 128 bytes of "0" bits, if video objects of the present recording or of the previous recording (or of both recordings) are encrypted according to the VCPS. In case of a prior VCPS recording, the disc contains a Unique ID and a Disc Key Block in "Buffer Zone 2" 20*a* of the Lead-In zone 20. In case the prior recording was done without using VCPS but the present recording with VCPS, the Unique ID and Disc Key Block are recorded in "Buffer Zone 2" 20*a*.

Figure 3C:
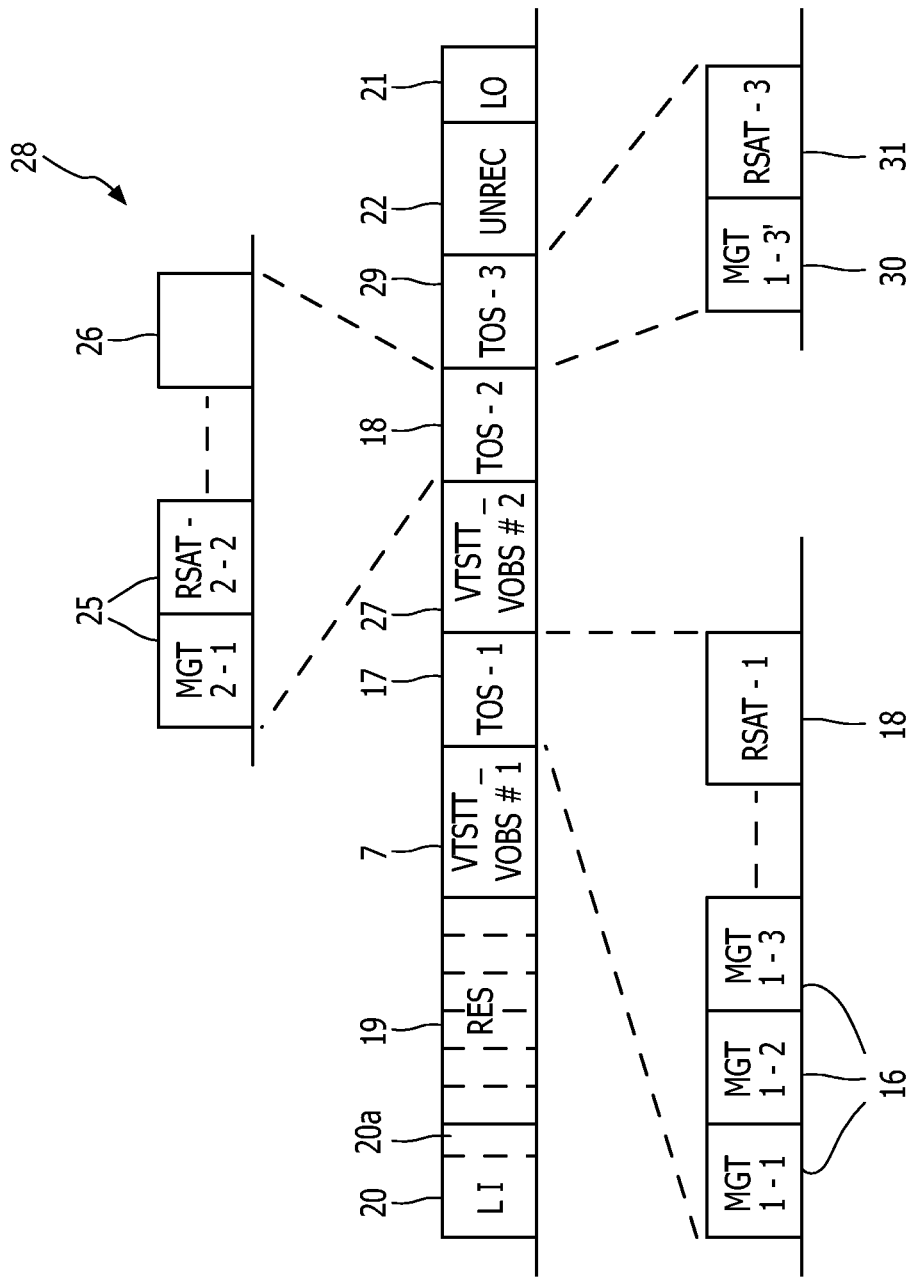

Next, FIG. 3C shows a Video Data Structure 28 after an update is being made to the management information without necessitating to make changes to the corresponding VTSTT_VOBS. For instance, a user may edit a recording, resulting in only a change in the VRMI 13. A new menu page may also be needed. Then there may be no need for changing the VTSTT_VOBS 7 or 27.

The update only affects part of the Management Data (MGT1-1, MGT1-2, MGT1-3) of the first recording as only MGT1-3 thereof is obsolete. The new version of MGT1-3 referred to as MGT1-3' is recorded in a new Temporary Overview Space (TOS-3) 29 appended to the previous Temporary Overview Space (TOS-2) 18. TOS-3 contains MGT1-3' and a new Reserved Space Allocation Table (RSAT-3) 31 containing the updated mapping corrected for MGT1-3 (now obsolete) and MGT1-3' (replacement). The previous Reserved Space Allocation Table (RSAT-2) 26 has become obsolete by this, indicated by having TOS-3 the highest version number.

The structure of the mapping table comprised by the RSAT-3 corresponds to that described in the context of FIG. 3B, thus depending on whether encrypted content is present. The content of Buffer Zone 2 20*a* is not changed compared to the state shown in FIG. 3B.

Figure 3D:
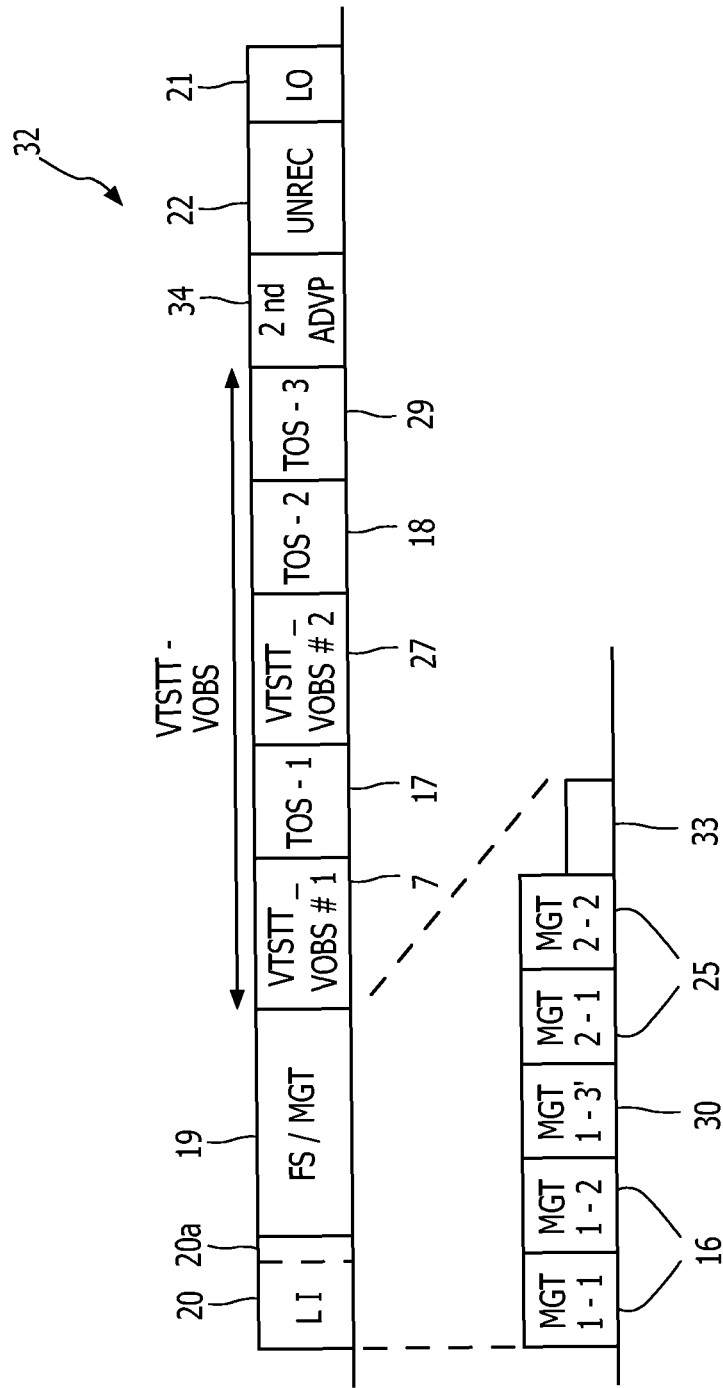

Next, FIG. 3D shows a Video Data structure 32 after a finalizing step has been performed. All Data Management Data (MGT1-1, MGT1-2, MGT1-3', MGT2-1, MGT 2-2) 16, 30, 25 is copied to the Reserved Space 19, comprising also file system data such as UDF. In the remaining space 33 in the Reserved Space that is not occupied by the Management Data 16, 30, 25 arbitrary data is recorded. Also the Lead-In area 20 and Lead-Out area 21 are being recorded. Assuming that VCPS-encrypted content is present, Buffer Zone 2 20*a* is left unchanged in this recording of the Lead-In area 20. Buffer Zone 2 20*a* is only written to in the context of the finalizing step if the disc does not contain any VCPS-encrypted content.

It is remarked that the back-up files (VRMI-BUP, VTSI_BUP) 14, 8 are included in the last Temporary Overview space (TOS-3) 29 and are not being remapped. Including of such files in the Temporary Overview space increases robustness. Also after the last VRMI_BUP, a second Anchor Volume Descriptor Pointer (AVDP) 34 should be present, as requested by the UDF file system.

Figure 4:
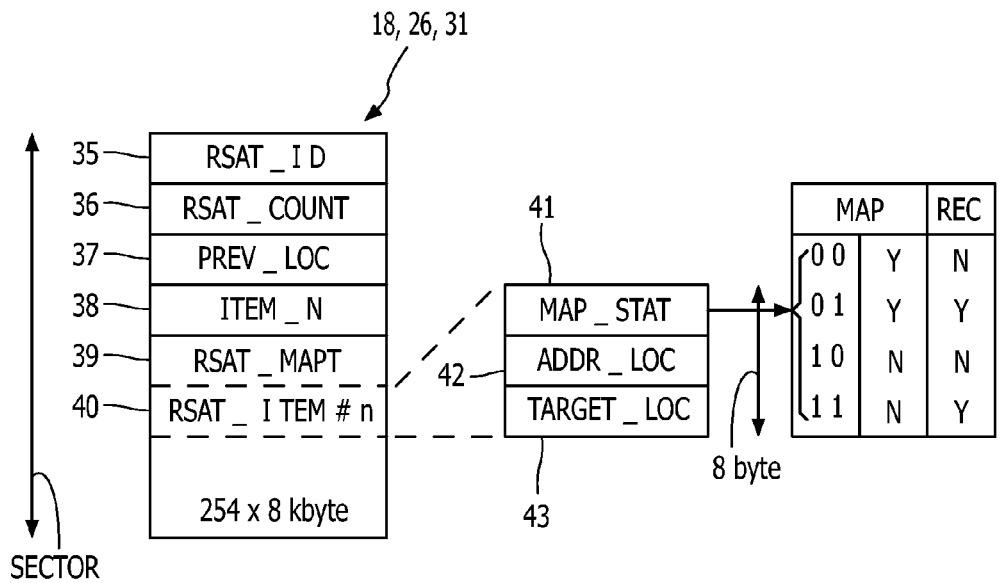
FIGS. 4 and 5 embodiments of the Reserved Allocation Table.

FIG. 4 shows a first embodiment of a Reserved Space Allocation Table (RSAT) 18, 26, 31 comprising maximal 1 Logical Sector (2048 bytes).

The RSAT_ID 35 (4 bytes) contains a string containing "RSAT".

The RSAT_COUNT 36 (1 byte) contains a decimal number indicating the version number of the Reserved Space Allocation Table (18, 26, 31). The first time an RSAT is recorded, this field is set to 0. For each new version of RSAT the value of this field is incremented by one.

The PREV_LOC (3 bytes) 37 contains the Logical Sector Number (LSN) of the location where the previous RSAT can be found.

The ITEM_N (1 byte) 38 indicates the number of used RSAT_ITEMS in the RSAT Mapping Table (RSAT_MAPT)

The RSAT_MAPT (2032 bytes) 39 contains 254 RSAT_ITEMS (8 bytes) 40 of 8 bytes each. Used RSAT_ITEMS 39 are placed before any unused RAST_ITEMS 39. All bytes of unused RSAT_ITEMS 39 are set to 0. The used RSAT_ITEMS 39 divide the recording area of a DVD disc, between the LI and the LO, into ITEM_N mapping segments, each consisting of a consecutive sequence of logical sectors. The mapping segments are linearly mapped on to target segments of the same size. The RSAT_MAPT 39 of FIG. 4 does not have a mapping-table header. According to the invention, this implies that this RSAT has the second mapping-table structure that is used if no VCPS-encrypted content is present on the disc and the current recording does not include adding VCPS-encrypted content either.

A RSAT_ITEM 40 contains a MAP_STAT 41 (2 bits) indicating the mapping status for the segment starting at ADDR_LOC 42 of this item and ending just before ADDR_LOC 42 of the next item. If there is no next item, the mapping status remains the same for all following logical sector numbers until the last written sector.

Possible values of MAP_STT 41 are given in the table within FIG. 4. 00b (binary) indicates that the corresponding segment is not recorded and that addresses locations are mapped to new target locations. 01b indicates the segment is reserved for a recorded segment with address locations mapped to new target locations. 10b indicates that a segment is not recorded and that target locations are identical to addressed locations. 11b indicates that the segment is recorded and the target locations are identical to the addressed locations.

ADDR_LOC 42 (3 bytes) contains the Logical Sector Number (LSN) of the first sector of the mapping segment, such as an ECC-block comprising 16 Physical Sectors. In that case the ADDR_LOC 42 shall be a multiple of 16. The RSAT_ITEMS 40 are increasing such that ADDR_LOC 42 is increasing.

TARGET_LOC (3 bytes) contains the Logical Sector Number (LSN) of the first sector of the target segment. The sector at ADRR_LOC+n is mapped onto the sector at TARGET_LOC+n with n in the range from 0 to ADDR_LOC (current)−ADDR_LOC (current)−1.

In the presence of VCPS-encrypted content the structure of the RSAT_MAPT 39 would comprise at its very beginning a mapping-table header field comprising a number of bytes filled with "0" bit values, thus shifting all RSAT_ITEM fields of the RSAT_MAPT 39 by a corresponding number of byte positions to higher address values as compared to that shown in FIG. 4. Such a structure of the RSAT_MAPT field 39 represents a first mapping-table structure according to the invention. An example of a mapping-table header field will be explained in the context of FIG. 5 below.

Figure 5:
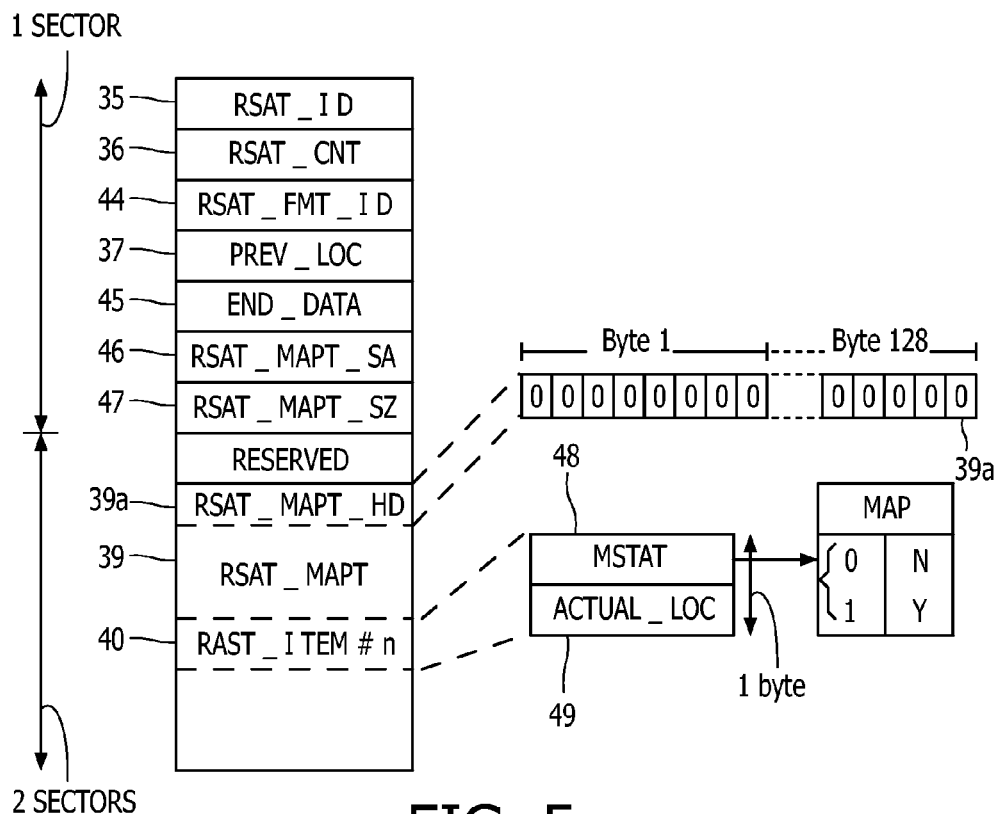

FIG. 5 shows an alternative embodiment of Reserved Space Allocation Table (18,26,31) comprising 3 Logical Sectors. Where appropriate similar reference numbers as in FIG. 4 are being used. Similar are a RSAT_ID (4 bytes) 35 and a RSAT_COUNT (2 bytes) 36.

New, in comparison to FIG. 4, is the RSAT_FMT_ID 44 (1 byte) for indicating the RSAT format mode as used by an application.

A PREV_LOC (3 bytes) 37 is again similar.

New, in comparison to FIG. 4, is the END-DATA (3 bytes) 45 which contains the Logical Sector Number (LSN) of the last sector containing application data that is not intended to allocated in the Reserved Space 19. When RSAT_FMT_ID 44 is set to 1, END_DATA 45 indicates the location of the second Anchor Volume Descriptor Pointer AVDP 34 of an UDF file system.

RSAT_MAPT_SA (2 bytes) 46 contains the start address of the RSAT_MAPT 39 in bytes relative to the start address of RSAT. It can thus be understood as a pointer to the RSAT_MAPT 39.

RSAT_MAPT_SZ (2 bytes) 47 contains the size of RSAT_MAPT in bytes.

The RSAT_MAPT (2 sectors) 39 contains a mapping-table header field RSAT_MAPT_HD 39a, thus forming a first mapping-table structure according to the invention, and 1024 RSAT_ITEMS (4 bytes) 40. RSAT_ITEM#n contains the mapping information for the (n+1)st ECC block in the Reserved Space 19.

RSAT_MAPT_HD 39a is 128 bytes, each byte containing 8 bit, each bit being set to "0".

MSTAT (1 bit) 48 indicates the mapping status for the (n+1) st ECC block in the Reserved Space 19. 0b (b: binary) indicates that this ECC block is in use and 1b indicates that this ECC block is mapped to another location. If MSTAT equals 0b, no data is recorded for logical sectors in the range from LSN=(n×16) to LSN=((n×16)+15).

If MSTAT equals 1b, data recorded for logical sectors in the range from LSN=(n×16) to LSN=((n×16)+15) can be found at locations indicated by ACTUAL_LOC (3 bytes) 49.

ACTUAL_LOC 49 then contains the LSN of the first sector of the ECC-block where the data is actually recorded. The value recorder in ACTUAL_LOC 49 shall be a multiple of 16. (The three least significant bits of ACTUAL_LOC 49 shall always be set to 000b. If MSTAT 48 equals 0b, the value recorded in ACTUAL_LOC 49 shall be 000000h.

In the absence of VCPS-encrypted content the structure of the RSAT_MAPT 39 would not comprise at its very beginning the mapping-table header field 39a, thus shifting all RSAT_ITEM fields of the RSAT_MAPT 39 by a corresponding number of byte positions to lower address values as compared to that shown in FIG. 4. Such a structure of the RSAT_MAPT field 39 would represent a second mapping-table structure according to the invention.

Figure 6:
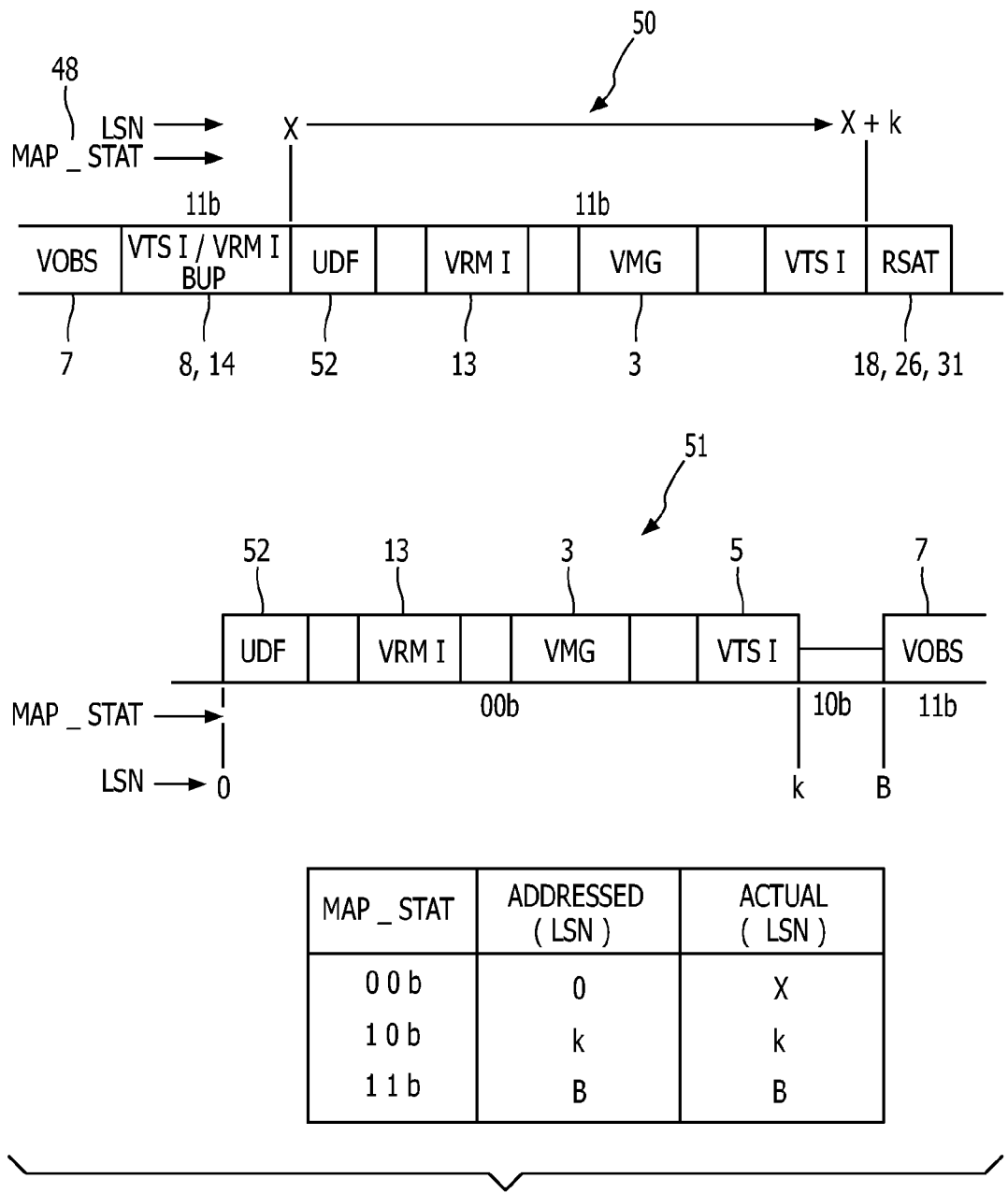
FIGS. 6, 7 and 8 examples of use of a Reserved Allocation Table.

FIG. 6 shows a first example of possible use of a Reserved Space Allocation Table (RSAT) such as those of the embodiments shown in FIGS. 4 and 5, and FIG. 12 below, in Video applications. Illustrated are the recording space 51 according to a 'real' disc and the recording space 52 according to a 'virtual' disc to be obtaining by mapping the 'real' disc. In this example the 'real' disc have not been finalized, so the management information (VRMI 13, VMG 3, VTSI 5), the backup therefrom (VTSI_BUP 8 and VRMI_BUP 14) and file information (UDF 52) are recorded after the last recorded VTSTT_VOBS 7 (corresponding to the earlier mentioned Management Data (MGT) 16.

Further shown are the MAP_STAT 48 and the Logical Sector Number LSN for each area. The recording space 51 corresponds to the Reserved Space 19 and reflects a "virtual" disc obtained by mapping the 'real' disc. The area between LSN=k and LSN=B should be recorded with arbitrary data after finalization.

The corresponding table in FIG. 5 shows corresponding values of MAP_STAT 41, addressed location (ADDRESSED) and actual location (ACTUAL). MAP_STAT 41=00b indicates mapped and not recorded, 10b indicates not mapped and not recorded and 11b indicates not mapped but recorded.

Figure 7:
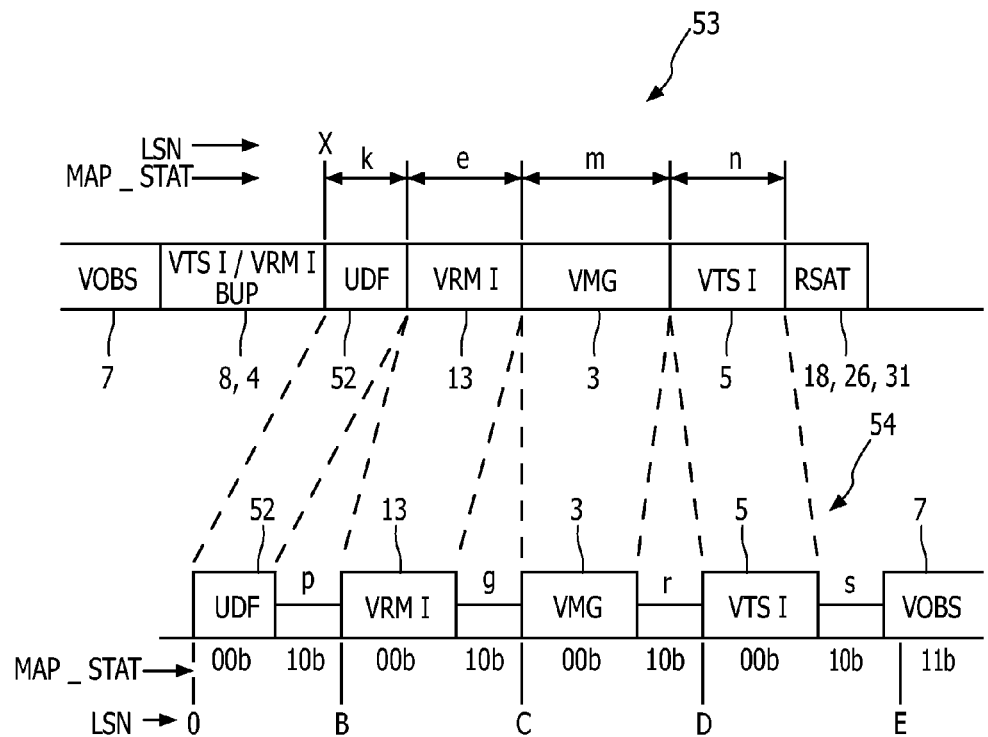

FIG. 7 shows a second example of possible use of a Reserved Space Allocation Table (RSAT) 18, 26, 31 in Video applications when making a second recording. The recording space 53 corresponds to the 'real' disc and the recording space 54 to the 'virtual' disc obtained by mapping the 'real' disc. This example differs from the example given in FIG. 6 in that the recorded area in the Temporary Overview Space (TOS) 17 is kept as small as possible by having the Management Data (MGT) 16 recorded mutually contiguously. Only when finalizing, the correct locations (A, B, C, C) are assigned with unused in between areas p, q, r and s within in the Reserved Space (RES) 19.

Figure 8:
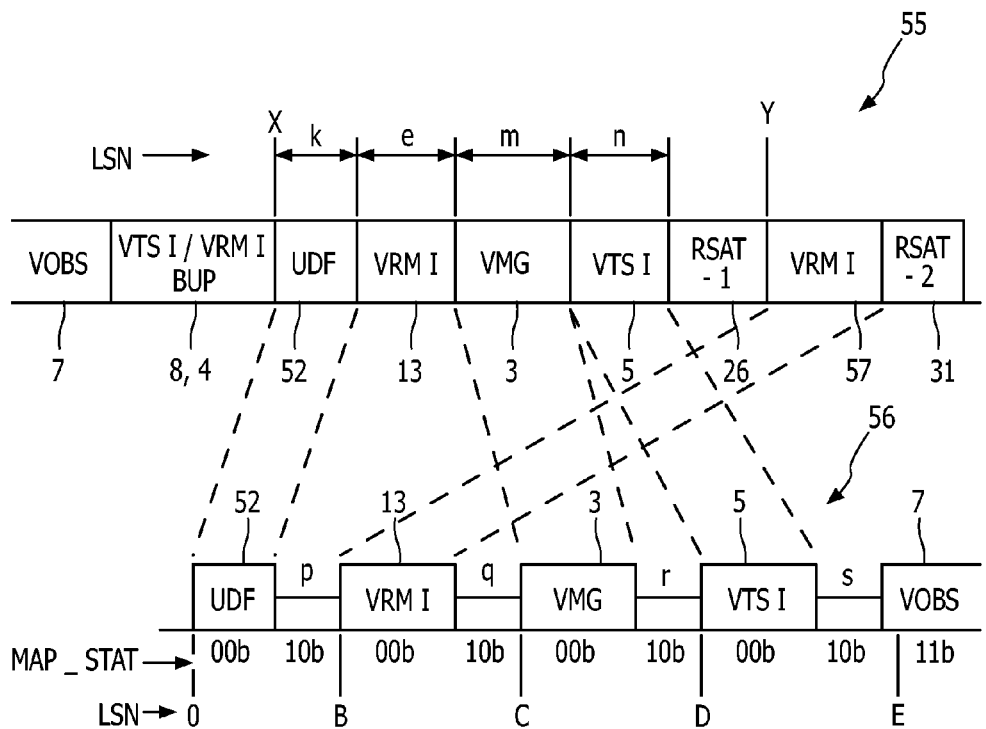

FIG. 8 shows a third example of possible use of a Reserved Space Allocation Table (RSAT) 18, 26, 31 when making an update of the Video Recorder Management Information (VRMI) 13 only. The recording space of the 'real' disc denoted by 55 and of the corresponding 'virtual' disc by 56. Because of the update, the previous Reserved Space Allocation Table (RSAT-1) 26 is not used anymore and replaced by a next Reserved Space Allocation Table (RSAT-2) 31. The RSAT-2 comprises the old mapping contained in RSAT-1 except for the mapping of the old VRMI 26, which is replaced, by a mapping for the updated VRMI 27.

Figure 9:
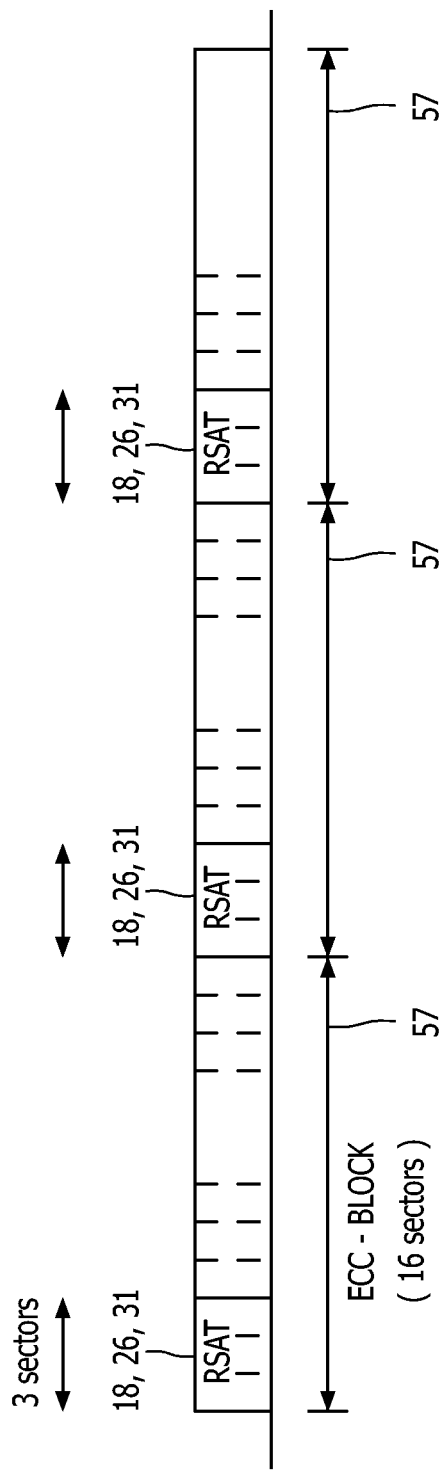
FIG. 9 an embodiment of allocation of the Reserved Allocation Table.

FIG. 9 shows an embodiment of allocation of the Reserved Space Allocation Tables (RSAT) 18, 26, 31. In this embodiment the area reserved for RSAT 18,26,31 consists of the last 2 or 3 recorded ECC blocks 57 of the Reserved Space 19, each containing a RSAT 18, 26, 31. Each occurrence being identical and located before the first byte of the first sector of each ECC block 57. All bytes not belonging to a RSAT 18,26, 31 are reserved and are set to an arbitrary value.

Figure 10:
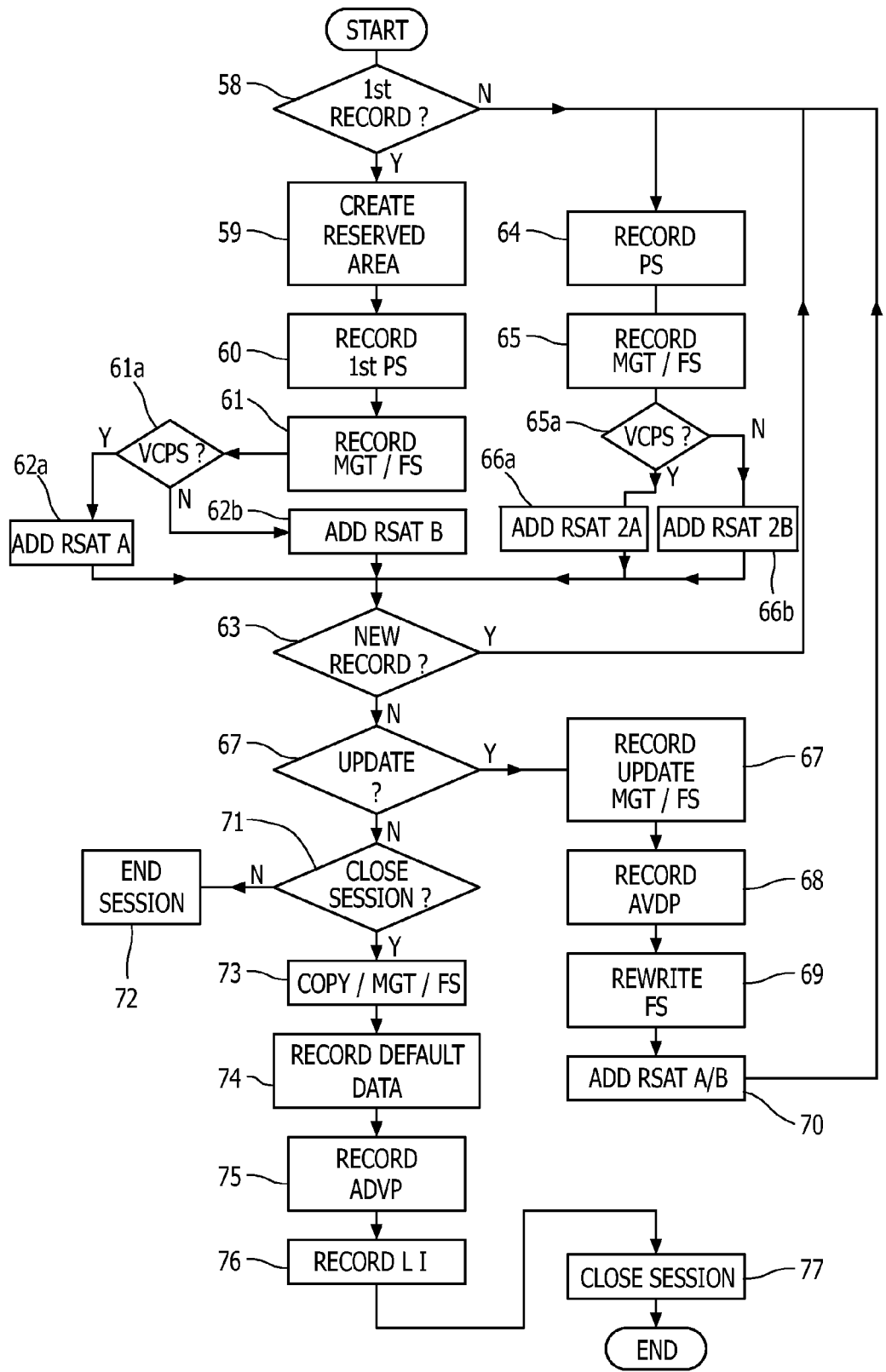
FIG. 10 an embodiment of a method of recording using a Reserved Allocation Table.

FIG. 10 shows a method of recording according to an embodiment of the invention, using a Reserved Allocation Table (RSAT). The method may be executed by a general processor executing a loaded application program. Such as for instance in case of stand alone disc drive coupled to a computer system. The method may also be executed by dedicated processing hardware. Such as for instance in case of a built-in disc drive in a recording apparatus. Also part of the functionality may be built in the drive itself.

In a first step 58 it is determined whether a first recording is to be made on a blank disc of the recordable-type only. If this is the case, a drive is requested in step 59 to create a Reserved Space (RES) 19 at Physical Sector Number PSN=0003 0000h up to PSN=0003 3FF0h. In step 60 an audio/video information signal such as an MPEG-2 Program Stream with the audio-visual content for the first recording is written starting from address PSN=0003 4000h. In case of a VCPS-encoded recording, a Unique ID and a Disc Key Block are written to Buffer Zone 2 20a of the Lead-In Zone 20 in accordance with the VCPS specifications, cf. FIG. 3A. Recording stops at a 16-sector boundary (in view of an ECC block of 16 sectors). The recorded stream complies with the Video Object Set for a Title (VTSTT_VOBS) specifications as defined in the DVD Video Data structure 12 for a DVD disc of the rewritable type as explained with reference to FIG. 2.

In step 61 all Management Data (MGT) 16 as required by the above-mentioned specifications is recorded following the recorded audio/video signal. Backup files for Video Title Set Information (VTSI_BUP) 5, Video Recorder Management Information (VRMI_BUP) 14 and the Second Anchor Volume Descriptor 34 are recorded in this order contiguously.

Step 61a illustrates that a selection is made for performing one of the alternative steps 62a and 62b. In step 62a, an area for a Reserved Space Allocation Table (RSAT A) containing a mapping table with a mapping-table header field (first mapping-table structure) is appended of, for instance 32 of 48 sectors, including 2 or 3 instances of a Reserved Space Allocation Table (RSAT) with the version number set to 0. An example of such a RSAT was given in FIG. 5. In step 62b, an area for a Reserved Space Allocation Table (RSAT B) containing a mapping table without a mapping-table header field (second mapping-table structure) is appended of, for instance 32 of 48 sectors, including 2 or 3 instances of a Reserved Space Allocation Table (RSAT) (18,26,31) with the version number set to 0. An example of such a RSAT was given in FIG. 4. Step 62a is selected if the recording at step 60 was performed in accordance with the VCPS specification, and thus involved recording encrypted content. Step 62b is selected, if the recording at step 60 was not performed in accordance with the VCPS specification, and thus involved non-encrypted content.

FIG. 3A illustrates the general result after such a first recording. If, either in step 58 or step 63 is has been determined that a second or higher recording has to be made, then in step 64 an second audio/video information stream such as an MPEG-2 Program Stream is written starting from the last written address after step 62. The area starting at Physical Sector Number PSN=000 3 4000h until the end of the second recording complies with the above-mentioned VTSTT_VOBS specifications. The previously written Management Data (MGT1) 16 and Reserved Space Allocation Table (RSAT-1) 18 are fully absorbed by the new VTSTT_VOBS (27).

Again, in step 65, all new Management Data (MGT2) 25 is recorded following the second recording contained in a new Video Object Set for a Title (VTSTT-VOBS#2) 27.

Step 65a illustrates that a selection is made for performing one of the alternative steps 66a and 66b. In step 66a, a new Reserved Space Allocation Table (RSAT2A) is added, similar to step 62a (first mapping-table structure), with the version number increased to 1. An example of the general structure such a RSAT was given in FIG. 5. In step 66b, a new Reserved Space Allocation Table (RSAT2B) is added, similar to step 62b (second mapping-table structure), with the version number increased to 1. An example of the general structure of such a RSAT was given in FIG. 4. Step 66a is selected if the one of the recordings at step 60 or 65 was performed in accordance with the VCPS specification, and thus involved recording encrypted content. Step 62b is selected, if none of the recordings at step 60 and 65 was performed in accordance with the VCPS specification, and thus involved non-encrypted content.

The general result is illustrated in FIG. 3B.

In step 67 it is determined if only an update of the Management Data (MGT) 16 has to be recorded. Is so, then in step 68 a new version of the VRMI 13, the backup VRMI-BUP 14 and if necessary, VMG 3 files is recorded.

In step 68 a new second AVDP 34 is recorded after, at least, the VRMI-BUP 14. Both are not mapped by the corresponding RSAT. If necessary, part of the file system data is rewritten in step 69. Finally, in step 70, an additional RSAT-3 31 is added with the version number increased to 3. The mapping-table structure corresponds to that generated in step 62a/b or 66a/b, respectively. The result is shown in FIG. 3D.

If no update or recording is required, it has to be determined in step 71 if the present recording session should be closed of left open (step 72). If the session is left open, the disc shall contain a Reserved Space (RES) 19 and a Temporary Overview Space (TOS) 17.

If the session should be closed, the Management Data (MGT) 16, 25, 30 is copied from the Temporary Overview Space (TOS) 17, 24, 29 to the Reserved Space (RES) 19 in accordance with the mapping information contained in the Reserved Space Allocation Tables (RSAT) 18, 26, 31 in step 73. Next, in step 74, arbitrary data is recorded to all sectors in the Reserved Space (RES) 19 that all still unrecorded after the previous recording step.

In step 75, the final second Anchor Volume Descriptor (AVDP) 34 is added to end of the data structures. In step 76, the Lead-In area (LI) 20 is recorded according to the requirements for this area. Finally, in step 77, the session is closed by recording appropriate closure data. In that case no more video content according to the specified DVD Video Data Structures for a disc of the Write Once type can be recorded, although it is still possible to add other data.

Alternatively, the disc could be finalized by recording a Lead-Out area (21) instead of the above-mentioned closure data. In that case also no other data can be recorded.

Compatibility with the DVD Video Data Structures for a DVD disc of the Read-Only type is only obtained when the disc has a Lead-In (LI) 20, all sessions have been closed and there are no blank areas between the start of the Lead-In (LI) 20 and the end of last closure or Lead-Out area (LO) 21.

Figure 11:
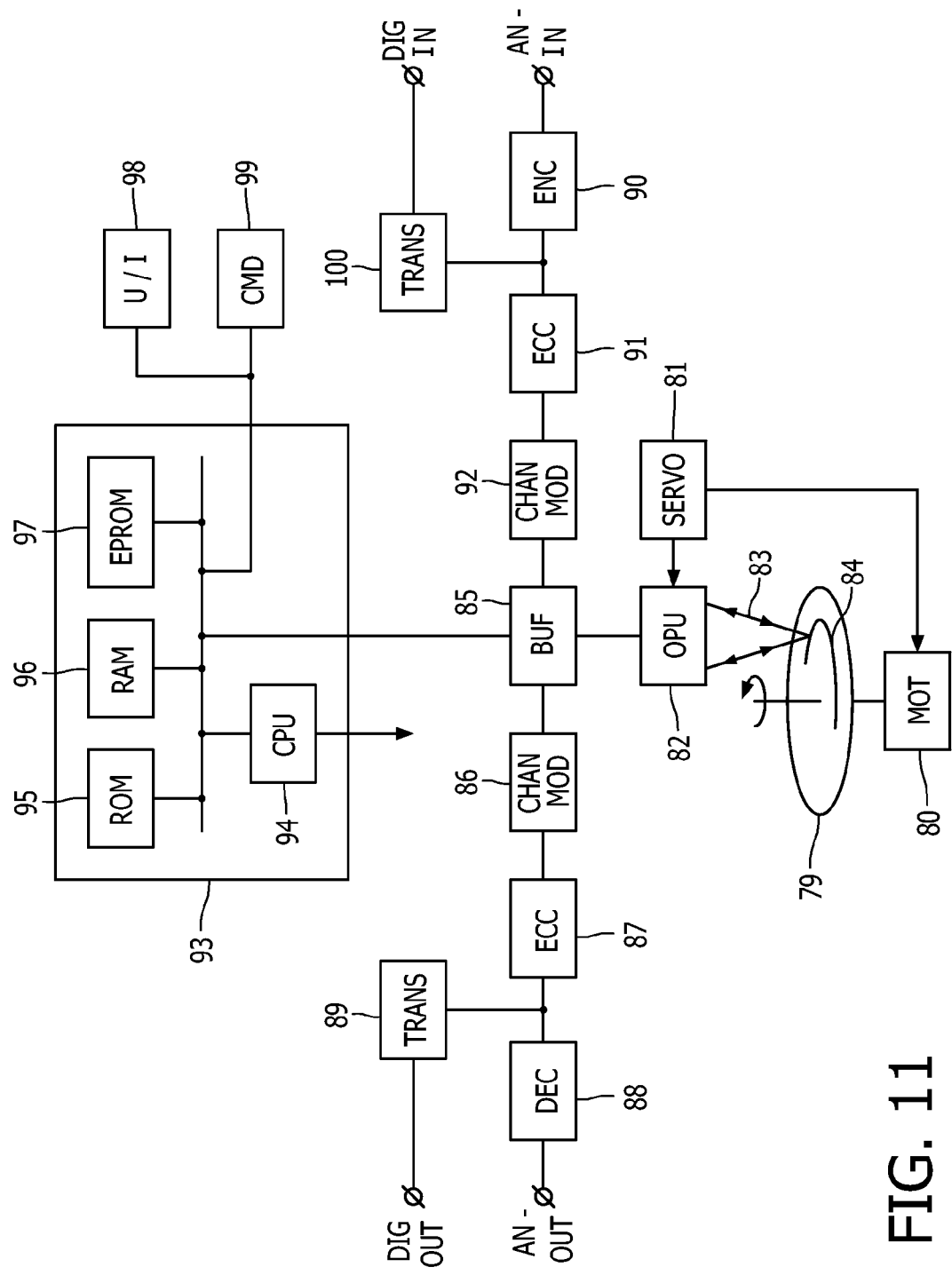
FIG. 11 an embodiment of a recording device using a Reserved Allocation Table.

FIG. 11 shows a recording device according to an embodiment of the invention. A recordable disc of the DVD write-once type 79 is rotated by rotational drive means 80 controlled by servo motor control means 81. These servo motor control means 81 further control the positioning of an optical reading/recording unit 82 for scanning the disc 79 with a focused reading/recording laser beam 83 along a track 84.

This unit 82 comprises laser beam generating means as well as radiation sensitive detectors to convert reflected radiation into electrical signals. The digital data represented by these electrical signals are stored in buffer memory means 85. Channel demodulation means 86 and error-correction means 87 demodulate, respectively error-correct the channel coded information for obtaining the user data. The user data, which in case of video data is compressed according to a suitable compression format such as for instance the MPEG2-format. The compressed user data is decompressed with decoding means 88 (e.g. a MPEG-2 decoder) and converted into analogue signals by AD converter means. The user data may alternatively be outputted digital and compressed by using suitable transcoding means 89.

Reversibly, received analogue signals are converted into digital signal via DA converter means and subsequently MPEG-2 compressed by suitable encoding means 90, provided with error correction data by error correcting means 91 and channel encoded by channel modulation means 92. Also a digital compressed signals may be inputted via second transcoding means 100.

The channel modulation in case of DVD discs is of the EFM+ type.

A control unit 93 may control each unit as such as well as the cooperation between these units by control signals nor further shown in the figure. To this purpose the control unit comprises general processor means 94 connected with electronic memory means of the Read-Only type (ROM) 95, the Random-Access type (RAM) 96 and/or the erasable programmable type (EPROM) 97. The processor means 94 operates according to a loaded computer control program, stored in the above mentioned memory means 95-97 to perform the above-mentioned method. To receive control instructions the control unit 93 is connected to user interface means 98 and user command means 99.

The recording device shown with reference to FIG. 11 may either be a stand-alone recording device or may be a combination of a disc recording drive connected to general computer means provided with a program to perform the claimed method.

Further Embodiments of the amended RSAT field according to the invention are described next below.

The Reserved Space Allocation Table (RSAT) provides the mechanism to treat the Reserved Fragment of the open DVD+R Video Session as a virtual rewritable area of 31 MB.

As long as the Session is open, writing to locations below LSN (003E00h) results in appending to the Incomplete Fragment followed by writing an updated version of the RSAT. Reading from locations below LSN (003E00h) results in reading from locations in the Incomplete Fragment, according to the mapping information provided by the RSAT.

When finalizing the disc the RSAT could be used to find the location of data that needs to be copied to the Reserved Fragment.

When the disc contains the structures for the Video Content Protection System, then the first ECC block of the reserved fragment (from LSN (000000h) is reserved and thus cannot mapped by information in the RSAT. The first ECC block is written when the Buffer Zone 2 is written and must not be overwritten when finalizing the disc. The RSAT therefore has a separate format for discs with VCPS information in the Buffer Zone 2.

In the following, the format of the RSAT will be compared for the two cases, in which a disc either has or does not have VCPS encrypted data.

Format of RSAT for Disc with no VCPS

The format of a RSAT including a mapping table having the second mapping-table structure is shown in Table 1 below.

TABLE 1

Format of a RSAT including a mapping table having the second mapping-table structure

| RBP | Contents | Number of bytes |
|---|---|---|
| 0 RSAT_ID | RSAT Identifier | 4 bytes |
| 4 reserved | Reserved | 2 bytes |
| 6 RSAT_COUNT | RSAT update counter | 2 bytes |
| 8 RSAT_FMT_ID | RSAT Format Identifier | 1 byte |
| 9 PREV_RSAT | Previous location of RSAT | 3 bytes |
| 12 reserved | Reserved | 1 byte |
| 13 END_DATA | End of active part of Data Zone | 3 bytes |
| 16 RSAT_MAPT_SA | Offset to start of RSAT_MAPT | 2 bytes |
| 18 RSAT_MAPT_SZ | Size of RSAT_MAPT | 2 bytes |
| 20 reserved | Reserved | 1004 bytes |
| 1024 RSAT_UD | RSAT user data | 1024 bytes |

TABLE 1-continued

Format of a RSAT including a mapping table having the second mapping-table structure

| RBP | Contents | Number of bytes |
|---|---|---|
| 2048 RSAT_MAPT | RSAT Mapping Table containing 992 RSAT_ITEMs of 4 bytes | 3968 bytes |
| 6016 reserved | Reserved | 128 bytes |
| | Total | 6144 bytes |

The fields listed in Table 1 will next be explained in more detail.

(RBP 0) RSAT_ID

RSAT Identifier containing the string "RSAT" with a-characters of the ISO-646 character set.

(RBP 6) RSAT_COUNT

RSAT_COUNT contains a value indicating the version number of RSAT. The first time an RSAT is recorded on the disc this field is set to 0. For each new version of RSAT the value of this field is incremented by one. If necessary, RSAT_COUNT wraps around from 65535 to 0. Note that all instances of the RSAT in the RSAT area have the same value of RSAT_COUNT.

(RBP 8) RSAT_FMT_ID

This field contains the fixed value (01h) indicating RSAT format mode 1 as used by the DVD+R Video application with no VCPS.

(RBP 9) PREV_RSAT

This field contains the LSN of the location of the first instance of the previous version of RSAT. For the first version of RSAT the value of PREV_RSAT shall be (000000h).

(RBP 13) END_DATA

This field contains the LSN of the last sector containing application data that is not intended to be allocated in the Reserved Fragment. END_DATA indicates the location of the $2^{nd}$ AVDP of UDF.

(RBP 16) RSAT_MAPT_SA

This field contains the fixed value (0800h) indicating the start address of RSAT_MAPT in bytes relative to the start address of RSAT.

(RBP 18) RSAT_MAPT_SZ

For RSAT format mode 1, this field contains the fixed value (0F80h) indicating the size of RSAT_MAPT in bytes.

(RBP 1024) RSAT_UD

The recorder that recorded the RSAT may use this field to store additional information.

RSAT_MAPT

The format of a mapping table (RSAT_MAPT) having the second mapping-table structure is shown in TABLE 2 below. RSAT_MAPT contains a list of 992 RSAT_ITEM fields, implicitly numbered from 0 to 991 depending on the position in the list, as shown symbolically in TABLE 2.

TABLE 2

Format of the second mapping table structure

RSAT_ITEM #0
RSAT_ITEM #1
RSAT_ITEM #2
. . .
. . .
RSAT_ITEM #990
RSAT_ITEM #991

RSAT_ITEM #n contains the mapping information for the $(n+1)^{st}$ ECC Block in the Reserved Fragment. The format is shown in Table 3.

RSAT_ITEM #n

TABLE 3

Format of the RSAT_ITEM field in the second mapping-table structure

| b31 | b30 | b29 | b28 | b27 | b26 | b25 | b24 |
|---|---|---|---|---|---|---|---|
| MSTAT | Reserved | | | | | | |
| b23 | b22 | b21 | b20 | b19 | b18 | b16 | b17 |
| ACTUAL_LOC [23 . . . 16] | | | | | | | |
| b15 | b14 | b13 | b12 | b11 | b10 | b9 | b8 |
| ACTUAL_LOC [15 . . . 8] | | | | | | | |
| b7 | b6 | b5 | b4 | b3 | b2 | b1 | b0 |
| ACTUAL_LOC [7 . . . 0] | | | | | | | |

MSTAT

This field indicates the mapping status for the $(n+1)^{st}$ ECC Block in the Reserved Fragment.

0b: This ECC Block is not in use.
1b: This ECC Block is mapped to another location.

If MSTAT equals (0b), no data is recorded for logical sectors in the range from LSN=(n×16) to LSN=((n×16)+15). If MSTAT equals (1b), data recorded for logical sectors in the range from LSN=(n×16) to LSN=((n×16)+15) can be found at locations indicated by ACTUAL_LOC.

ACTUAL_LOC

If MSTAT equals (1b), this 24-bit field contains the LSN of the first sector of the ECC Block where the data is actually recorded. The value recorded in ACTUAL_LOC shall be a multiple of 16. If MSTAT equals (0b), the value recorded in ACTUAL_LOC shall be (000000h).

Format of RSAT for Disc with VCPS Structures

The format of a RSAT including a mapping table having the first mapping-table structure is shown in Table 4 below. It is also illustrated in FIG. 12.

TABLE 4

Format of RSAT when using VCPS.

| RBP | Contents | Number of bytes |
|---|---|---|
| 0 RSAT_ID | RSAT Identifier | 4 bytes |
| 4 reserved | Reserved | 2 bytes |
| 6 RSAT_COUNT | RSAT update counter | 2 bytes |
| 8 RSAT_FMT_ID | RSAT Format Identifier | 1 byte |
| 9 PREV_RSAT | Previous location of RSAT | 3 bytes |
| 12 reserved | reserved | 1 byte |
| 13 END_DATA | End of active part of Data Zone | 3 bytes |
| 16 RSAT_MAPT_SA | Offset to start of RSAT_MAPT | 2 bytes |
| 18 RSAT_MAPT_SZ | Size of RSAT_MAPT | 2 bytes |
| 20 reserved | reserved | 1004 bytes |
| 1024 RSAT_UD | RSAT user data | 1024 bytes |
| 2048 RSAT_MAPT | RSAT Mapping Table containing 992 RSAT_ITEMs of 4 bytes | 4096 bytes |
| | Total | 6144 bytes |

The fields of TABLE 4 will next be explained in more detail.

(RBP 0) RSAT_ID

RSAT Identifier containing the string "RSAT" with a-characters of the ISO-646 character set.

(RBP 6) RSAT_COUNT

RSAT_COUNT contains a value indicating the version number of RSAT. The first time an RSAT is recorded on the disc this field is set to 0. For each new version of RSAT the value of this field is incremented by one. If necessary, RSAT_COUNT wraps around from 65535 to 0. Note that all instances of the RSAT in the RSAT area have the same value of RSAT_COUNT.

(RBP 8) RSAT_FMT_ID

This field contains the fixed value (02h) indicating RSAT format mode 2 as used by the DVD+R Video application with VCPS.

(RBP 9) PREV_RSAT

This field contains the LSN of the location of the first instance of the previous version of RSAT. For the first version of RSAT the value of PREV_RSAT shall be (000000h).

(RBP 13) END_DATA

This field contains the LSN of the last sector containing application data that is not intended to be allocated in the Reserved Fragment. END_DATA indicates the location of the $2^{nd}$ AVDP of UDF.

(RBP 16) RSAT_MAPT_SA

This field contains the fixed value (0800h) indicating the start address of RSAT_MAPT in bytes relative to the start address of RSAT.

(RBP 18) RSAT_MAPT_SZ

For RSAT format mode 2, this field contains the fixed value (0F7Fh) indicating the size of RSAT_MAPT in bytes.

(RBP 1024) RSAT_UD

The recorder that recorded the RSAT may use this field to store additional information.

Format of RSAT_MAPT for Disc with VCPS Structures

RSAT_MAPT contains a 128 byte header and a list of 991 RSAT_ITEM fields, implicitly numbered from 0 to 991 depending on the position in the list. This is illustrated by the following Table 5.

TABLE 5

| First mapping-table structure RSAT Mapping Table Header |
|---|
| RSAT_ITEM #0 |
| RSAT_ITEM #1 |
| RSAT_ITEM #2 |
| ... |
| ... |
| RSAT_ITEM #990 |
| RSAT_ITEM #991 |

The RSAT Mapping Table Header is 128 bytes and contains zeros. RSAT_ITEM #n contains the mapping information for the $(n+1)^{st}$ ECC Block in the Reserved Fragment, as shown in Table 6.

TABLE 6

| Format of the RSAT_ITEM field in the first mapping-table structure | | | | | | | |
|---|---|---|---|---|---|---|---|
| b31 | b30 | b29 | b28 | b27 | b26 | b25 | b24 |
| MSTAT | reserved | | | | | | |
| b23 | b22 | b21 | b20 | b19 | b18 | b16 | b17 |
| ACTUAL_LOC [23 ... 16] | | | | | | | |
| b15 | b14 | b13 | b12 | b11 | b10 | b9 | b8 |
| ACTUAL_LOC [15 ... 8] | | | | | | | |
| b7 | b6 | b5 | b4 | b3 | b2 | b1 | b0 |
| ACTUAL_LOC [7 ... 0] | | | | | | | |

MSTAT

This field indicates the mapping status for the $(n+1)^{st}$ ECC Block in the Reserved Fragment.

0b: This ECC Block is not in use.

1b: This ECC Block is mapped to another location.

If MSTAT equals (0b), no data is recorded for logical sectors in the range from LSN=(n×16) to LSN=((n×16)+15). If MSTAT equals (1b), data recorded for logical sectors in the range from LSN=(n×16) to LSN=((n×16)+15) can be found at locations indicated by ACTUAL_LOC.

ACTUAL_LOC

If MSTAT equals (1b), this 24-bit field contains the LSN of the first sector of the ECC Block where the data is actually recorded. The value recorded in ACTUAL_LOC shall be a multiple of 16. If MSTAT equals (0b), the value recorded in ACTUAL_LOC shall be (000000h). The first ECC block is not used and thus MSTAT equals (0b) for RSAT_ITEM #0

The embodiments illustrated with respect to the Figures are an improvement of the method and apparatus of the kind indicated known from WO22003030173. The method according to the invention guarantees that non-VCPS aware ("legacy") DVD+RW Video recorders will not destroy VCPS information in the Lead-in of a DVD+R disc that is vital for decrypting protected content stored by VCPS compliant recorders on the same disc.

DVD+RW video recorders will write the RSAT in the last written ECC blocks on a DVD+R disc after one or more recordings have been made, or after some playlist or menu editing has been done. These recorders need to read the RSAT to be able to find essential file system information, meta data and menu data. Also VCPS compliant recorders will do this and write an RSAT at the end in a format identical to the legacy device, as long as no content encryption has been applied. As soon as a first encrypted A/V recording is added to the disc, Buffer Zone 2 will be written to contain the Unique ID and Disc Key Block.

In order to prevent destroying the VCPS information, the format of the so-called RSAT (Reserved Space Allocation Table) field as known from WO2003030173 is amended in the mapping-table field RSAT_MAPT. This amended RSAT_MAPT table now includes a RSAT Mapping Table Header of preferably 128 bytes. Due to this the real RSAT Mapping Table data is repositioned 128 bytes further. Since the offset pointer is not changed, an existing implementation that makes use of the offset (RSAT-MAPT_SA) will also still look 128 bytes too early. The 128 bytes of nulls give 32 ECC blocks that are not used (1 MB) and this is where the file system should be. In this way existing recorders cannot recognize this as a valid DVD+R Video Recording format disc. So reading is stopped and the buffer zone data is not destroyed.

One of the advantages of the method according to the invention is that the earlier RSAT format is kept as far as possible. Due to this, the old recorders, being unfamiliar with the VCPS system, will find the header with all zeroes and than stop playing. Their behavior is predictable.

Although the invention is described with reference to an optically readable DVD disc of the Recordable type, other types of recordable discs may be used. The invention may be implemented by means of both hardware and software, and that several 'means' may be represented by the same item of hardware.

The invention claimed is:

1. Method of contiguously recording a sequence of ordered audio and video information signals, such as video/audio information, and corresponding management information signals, such as video management, menu information or file information, on a disc-like recording medium of the write-once type, such as an optically recordable and readable disc, the recorded information complying to the requirements of ordering of such information as defined by a disc of the read-only type or of the rewritable type; the method comprising the following steps:

allocating a reserved area within a linear addressing space;

contiguously recording the audio and video information signals in a video recording area located succeeding the reserved area;

recording corresponding first management data in a temporary overview space succeeding the video recording area;

generating a mapping table for mapping the recorded first management data to address locations in the reserved area;

recording the mapping table in the temporary overview space;

wherein the step of generating the mapping table comprises selecting and performing one of the following alternative steps, if a respective one of the following conditions applies:

generating the mapping table in the form of a first mapping-table structure, if audio and video information signals representing an encrypted information content are recorded or if the recording medium already contains encrypted information content due to prior encrypted recording, and generating the mapping table in the form of a second mapping-table structure differing from the first mapping-table structure, if audio and video information signals representing a non-encrypted information content are recorded and if the recording medium does not contain any prior encrypted information content.

2. Method according to claim 1, wherein the step of generating the mapping table comprises generating a sequence of mapping-data fields, and in that the first mapping-table structure comprises a sequence of mapping-data fields forming the complete second mapping-table structure, and, in addition, a dummy-data field.

3. Method according to claim 2, wherein the step of recording the mapping table in the form of the first mapping-table structure on the recoding medium comprises recording the dummy-data field beginning at a first position reserved for the beginning of the mapping table.

4. Method according to claim 3, wherein the steps of generating the mapping table in the form of the first and of the second mapping-table structure comprise generating the mapping table as an integral part of a Reserved Space Allocation Table, and in that the beginning of the mapping table is defined relative to a position of a mapping-table-pointer data field contained in the Reserved Space Allocation Table.

5. Method according to claim 3, wherein, in the second mapping-table structure, the beginning of the mapping table is formed by a first mapping-data field for mapping at least one area in the temporary overview space containing recorded first management data to an address location in the reserved area, and in that the dummy-data field of the first mapping-table structure contains only dummy data unsuitable for mapping areas in the temporary overview space to address locations in the reserved area.

6. Method according to claim 1, further comprising a step of ascertaining whether information content to be recorded is encrypted, prior to the step of generating the mapping table.

7. Method according to claim 1, further comprising a step of encrypting information content to be recorded, so as to impede unlicensed access to the information content.

8. Method according to claim 1, wherein the step of encrypting the information comprises encrypting the information content according to the Video Content Protection System, VCPS.

9. Method according to claim 1, further comprising contiguously recording a next sequence of audio and video information signals on a next video recording area succeeding the previously recorded areas;

recording next corresponding management data in a next temporary overview space succeeding the next video recording area;

generating a next mapping table for mapping the first and the next recorded management data to address locations in the reserved area;

wherein the step of generating the next mapping table comprises selecting and performing one of the following alternative steps, if a respective one of the following alternative conditions applies:

generating the next mapping table in the form of the first mapping-table structure, if a next sequence of audio and video information signals representing an encrypted information content is recorded or if the recording medium already contains encrypted information content due to prior encrypted recording, and generating the next mapping table in the form of the second mapping-table structure, if A/V information signals representing a non-encrypted information content are recorded and if the recording medium does not contain any prior encrypted information content.

10. Method according to claim 9, further comprising:

generating updated management information signals related to the mapping table recorded earlier;

recording at least the updated management information signals in the next temporary overview space succeeding the previous temporary overview space;

recording the next mapping table in the next temporary overview space.

11. Method according to claim 10, further comprising:

copying the recorded management information signals to the reserved area in correspondence to the latest mapping table;

recording the remaining unrecorded sections of the reserved area with arbitrary data signals;

recording a lead-in area preceding the reserved area with data according to the definitions of a disc of the read-only type or of the rewritable type, wherein, if the latest mapping table takes the form of the first mapping-table structure, a buffer zone 2 that is contained in the lead-in area according to the definitions of a disc of the read-only type or of the rewritable type is not recorded in this step;

recording a lead-out area succeeding the recorded area with data according to the definitions of a disc of the read-only type or of the rewritable type or with closure data for closing an actual video recording session.

12. Method according to claim 1, wherein recording the mapping table comprises recording a list of mapping items with mapping data containing a recorded address location and a corresponding target address location in the reserved area.

13. Method according to claim 1, further comprising:

recording the mapping table in the form of a list of mapping locations corresponding to all target address locations in the reserved area.

14. Method according to claim 4, further comprising:

recording a version number to each recorded Reserved Space Allocation Table.

15. Method according to claim 4, further comprising:
recording the address location of a previously recorded Reserved Space Allocation Table to a next Reserved Space Allocation Table containing the next mapping table.

16. Method according to claim 12, further comprising:
recording a mapping status to each mapping item indicating the item to be mapped or not.

17. Method according to claim 4, further comprising
recording back-up versions of the first or next management data in the temporary overview space,
generating the Reserved Space Allocation Table including back-up versions of the management data having a mapping status indicating that the back-up versions are not mapped.

18. Method according to claim 4, further comprising
recording the location of a backup of a file system in the Reserved Space Allocation Table.

19. Recording device for contiguously recording a sequence of ordered audio and video information signals, such as video/audio information, and corresponding management information signals, such as video management, menu information or file information, the recorded information complying to the requirements of ordering of such information as defined by a disc of the read-only type or of the rewritable type,
the recording device adapted to:
carry and rotate a disc-like recording medium of the write-once type, such as an optically recordable and readable disc,
scan a focused laser beam across a track of the disc-like recording medium;
modulate the laser beam in accordance with digital information signals to be recorded on the disc-like recording medium;
detect reflections of the laser beam scanning the disc-like recording medium and converting the reflection in digital information signals to be read;
modulate received digital audio and video information signals to information signals to be recorded;
control means for controlling the recording and reading of the digital information signals;
wherein the control means is adapted to:
allocate a reserved area within a linear addressing space on the disc-like recording medium;
contiguously record the audio and video information signals in a video recording area located succeeding the reserved area;
record corresponding first management data in a temporary overview space succeeding the video recording area;
generate a mapping table for mapping the recorded first management data to address locations in the reserved area;
record the mapping table in the temporary overview space, wherein
the control means is further adapted to select and perform one of the following two alternative steps, if a respective one of the following conditions applies:
generate the mapping table in the form of a first mapping-table structure if audio and video information signals representing an encrypted information content are to be recorded or if the recording medium already contains encrypted information content due to prior encrypted recording, and
generate the mapping table in the form of a second mapping-table structure differing from the first mapping-table structure, if audio and video information signals representing a non-encrypted information content are recorded and if the recording medium does not contain any prior encrypted information content.

20. Recording device according to claim 19 wherein
the control means is adapted to
generate the mapping table by generating a sequence of mapping-data fields, and
generate the first mapping-table structure by generating a sequence of mapping-data fields forming the complete second mapping-table structure, and, in addition, a dummy-data field.

21. Recording device according to claim 19, wherein the control means is adapted to record the dummy-data field on the recording medium beginning at a first position reserved for the beginning of the mapping table.

22. Recording device according to claim 21, wherein the control means is adapted to generate the mapping table in the form of the first and of the second mapping-table structure as an integral part of a Reserved Space Allocation Table, and to record the beginning of the mapping table at a position on the recording medium, which is defined relative to a position of a mapping-table-pointer data field contained in the Reserved Space Allocation Table.

23. Recording device according to claim 21, wherein the control means is adapted to generate the second mapping-table structure with a beginning formed by a first mapping-data field for mapping at least one area in the temporary overview space containing recorded first management data to an address location in the reserved area and to record to the dummy-data field of the first mapping-table structure only dummy data unsuitable for mapping areas in the temporary overview space to address locations in the reserved area.

24. Recording device according to claim 19, wherein the control means is adapted to ascertain whether information content to be recorded is encrypted before the generating the mapping table.

25. Recording device according to claim 19, wherein the recording device comprises encrypting means connected with the control means and adapted to encrypt an information content represented by the audio and video information signals so as to impede unlicensed access to the information content.

26. Recording device according to claim 19, wherein the encrypting means is adapted to encrypt the information content according to the Video Content Protection System, VCRS.

27. Recording device according to claim 19, wherein
the control means is adapted to
contiguously record a next sequence of audio and video information signals on a next video recording area succeeding the previously recorded areas;
record corresponding next management data in a next temporary overview space succeeding the next video recording area;
generate a next mapping table for mapping the recorded first and next management data to address locations in the reserved area;
record the mapping table in the next temporary overview space, wherein the control means is further adapted to select and perform one of the following two alternative steps, if a respective one of the following conditions applies:
generate the next mapping table in the form of the first mapping-table structure, if audio and video information signals representing an encrypted information content are to be recorded or if the recording medium already contains encrypted information content due to prior encrypted recording, and generate the mapping table in the form of the second mapping-table structure, if audio and video information signals representing a non-encrypted information content are recorded and if the recording medium does not contain any prior encrypted information content.

28. Recording device according to claim 27, wherein, the control means is adapted to:

generate updated corresponding management information signals related to the mapping table recorded earlier;

record at least the updated management information signals in the next temporary overview space succeeding the previous temporary overview space;

generate an updated next mapping table for mapping the updated management data and the remaining management data to address locations in the reserved area;

record the updated mapping table in the next temporary overview space.

29. A data medium comprising an executable computer program code for controlling the operation of a recording device in contiguously recording a sequence of ordered audio and video information signals, such as video/audio information, and corresponding management information signals, such as video management, menu information or file information, on a disc-like recording medium of the write-once type, such as an optically recordable and readable disc, the recorded information complying to the requirements of ordering of such information as defined by a disc of the read-only type or of the rewritable type;

the computer program code implementing a method comprising the following steps:

allocating a reserved area within a linear addressing space;

contiguously recording the audio and video information signals in a video recording area located succeeding the reserved area;

recording corresponding first management data in a temporary overview space succeeding the video recording area;

generating a mapping table for mapping the recorded first management data to address locations in the reserved area;

recording the mapping table in the temporary overview space, wherein the step of generating the mapping table comprises selecting and performing one of the following alternative steps, if a respective one of the following conditions applies:

generating the mapping table in the form of a first mapping-table structure, if audio and video information signals representing an encrypted information content are recorded or if the recording medium already contains encrypted information content due to prior encrypted recording, and generating the mapping table in the form of a second mapping-table structure differing from the first mapping-table structure, if audio and video information signals representing a non-encrypted information content are recorded and if the recording medium does not contain any prior encrypted information content.

30. A non-transitory disc-like recording medium of the write-once type, such as an optically recordable and readable disc, carrying recorded information complying to the requirements of ordering of such information as defined by a disc of the read-only type or of the rewritable type, the recorded information comprising encrypted information content, the recording medium including a reserved area within a linear addressing space encrypted audio and video information in a video recording area located succeeding the reserved area;

management data in a temporary overview space succeeding the video recording area;

a mapping table in the temporary overview space for mapping the management data to address locations in the reserved area;

wherein the mapping table takes the form of a first mapping-table structure containing a sequence of mapping-data fields for mapping areas in the temporary overview space to address locations in the reserved area, and, beginning at a first position reserved for the beginning of the mapping table, a dummy-data field that is completely formed by dummy data unsuitable for mapping areas in the temporary overview space to address locations in the reserved area.

31. The recording medium of claim 30, wherein the mapping table forms an integral part of a Reserved Space Allocation Table, and wherein the beginning of the mapping table is defined relative to a position of a mapping-table-pointer data field contained in the Reserved Space Allocation Table.

32. A reading device for reading recorded information from a non-transitory disc-like recording medium of the write-once type, such as an optically recordable and readable disc, carrying recorded information complying to the requirements of ordering of such information as defined by a disc of the read-only type or of the rewritable type, the recorded information comprising encrypted information content, the recording medium including:

a reserved area within a linear addressing space;

encrypted audio and video information in a video recording area located succeeding the reserved area;

management data in a temporary overview space succeeding the video recording area;

a mapping table in the temporary overview space for mapping the management data to address locations in the reserved area;

wherein the mapping table takes the form of a first mapping-table structure containing a sequence of mapping-data fields for mapping areas in the temporary overview space to address locations in the reserved area, and, beginning at a first position reserved for the beginning of the mapping table, a dummy-data field that is completely formed by dummy data unsuitable for mapping areas in the temporary overview space to address locations in the reserved area.

* * * * *